US012659403B2

(12) United States Patent
Gao et al.

(10) Patent No.: US 12,659,403 B2
(45) Date of Patent: Jun. 16, 2026

(54) INCOMING CALL REMINDER METHOD AND ELECTRONIC DEVICE

(71) Applicant: Honor Device Co., Ltd., Shenzhen (CN)

(72) Inventors: Weijie Gao, Shenzhen (CN); Jinlong Zhao, Shenzhen (CN); Xin Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 296 days.

(21) Appl. No.: 18/569,410

(22) PCT Filed: Apr. 26, 2023

(86) PCT No.: PCT/CN2023/091007
§ 371 (c)(1),
(2) Date: Dec. 12, 2023

(87) PCT Pub. No.: WO2024/016772
PCT Pub. Date: Jan. 25, 2024

(65) Prior Publication Data
US 2025/0126194 A1 Apr. 17, 2025

(30) Foreign Application Priority Data

Jul. 20, 2022 (CN) .......................... 202210854424.9

(51) Int. Cl.
*H04M 1/72484* (2021.01)
*H04L 67/145* (2022.01)
(Continued)

(52) U.S. Cl.
CPC ...... *H04M 1/72484* (2021.01); *H04L 67/145* (2013.01); *H04M 1/72409* (2021.01); *H04M 1/72469* (2021.01)

(58) Field of Classification Search
CPC ......... H04M 1/72484; H04M 1/72409; H04M 1/72469; H04M 3/02; H04M 3/42263;
(Continued)

(56) References Cited

U.S. PATENT DOCUMENTS

2012/0320192 A1 12/2012 Aoki et al.
2015/0024717 A1* 1/2015 Kochhar ............. H04L 65/1069
455/414.1
(Continued)

FOREIGN PATENT DOCUMENTS

CN 1614976 A 5/2005
CN 101742426 A 6/2010
(Continued)

OTHER PUBLICATIONS

Isabel Pedersen et al;"Embodied Computing: Wearables, Implantables, Embeddables, Ingestibles";Dec. 30, 2020;Retrieved from the internet, URL:https://direct.mit.edu/books/book/4639/Embodied-ComputingWearables-Implantables.
(Continued)

*Primary Examiner* — Matthew D. Anderson
(74) *Attorney, Agent, or Firm* — Conley Rose, P.C.

(57) ABSTRACT

An incoming call reminder method and an electronic device. A specific solution is as follows: In response to an incoming call received by a first electronic device, the first electronic device enters an incoming call ringing state, where the incoming call ringing state is used to remind a user of the incoming call; when the first electronic device is in the incoming call ringing state, the first electronic device receives a first heartbeat packet sent by the second electronic device; and the first electronic device sends a first heartbeat response to the second electronic device, where the first heartbeat response is used to keep the incoming call ringing state after the second electronic receives the first heartbeat (Continued)

response, and the second electronic is in the incoming call ringing state when sending the first heartbeat packet.

20 Claims, 19 Drawing Sheets

(51) Int. Cl.
*H04M 1/72409* (2021.01)
*H04M 1/72469* (2021.01)

(58) Field of Classification Search
CPC ........... H04M 3/465; H04M 1/724095; H04M 1/72454; H04M 2201/22; H04M 1/72412; H04L 67/145
See application file for complete search history.

(56) References Cited

U.S. PATENT DOCUMENTS

| | | | |
|---|---|---|---|
| 2016/0029202 A1 | 1/2016 | Leno et al. | |
| 2016/0277581 A1* | 9/2016 | Lam | H04M 1/72412 |
| 2018/0288211 A1 | 10/2018 | Kim | |
| 2021/0227389 A1 | 7/2021 | Baldwin | |
| 2022/0345563 A1* | 10/2022 | Ma | H04M 1/72439 |
| 2024/0380839 A1* | 11/2024 | Wang | H04M 3/465 |

FOREIGN PATENT DOCUMENTS

| | | | |
|---|---|---|---|
| CN | 103152490 A | 6/2013 |
| CN | 104158961 A | 11/2014 |
| CN | 104168256 A | 11/2014 |
| CN | 105379230 A | 3/2016 |
| CN | 105472153 A | 4/2016 |
| CN | 105898080 A | 8/2016 |
| CN | 108174043 A | 6/2018 |
| CN | 111464686 A | 7/2020 |
| CN | 112788183 A | 5/2021 |
| CN | 113014703 A | 6/2021 |
| CN | 113141435 A | 7/2021 |
| CN | 114244960 A | 3/2022 |
| CN | 115086481 A | 9/2022 |
| WO | 2011108377 A1 | 9/2011 |
| WO | 2018113536 A1 | 6/2018 |
| WO | 2019061070 A1 | 4/2019 |
| WO | 2022037551 A1 | 2/2022 |

OTHER PUBLICATIONS

Yu Yong-wei et al;"Implementation of a technology scheme based on mobile phone co shock";Information Technology and Informatization;Jan. 25, 2018;3pages.

* cited by examiner

1700

1800

INCOMING CALL REMINDER METHOD AND ELECTRONIC DEVICE

CROSS-REFERENCE TO RELATED APPLICATIONS

This is a U.S. National Stage of International Application No. PCT/CN2023/091007 filed on Apr. 26, 2023, which claims priority to Chinese Patent Application No. 202210854424.9, filed with the China National Intellectual Property Administration on Jul. 20, 2022, both of which are incorporated herein by reference in their entireties.

TECHNICAL FIELD

Embodiments of this application relate to the field of electronic devices, and in particular, to an incoming call reminder method and an electronic device.

BACKGROUND

Currently, a plurality of electronic devices may work together to provide more intelligent experience for a user. For example, when a device receives an incoming call, another device may also synchronously remind the user of the current incoming call, so that the user can know the current incoming call by using any synchronous reminder device. In this application, the multi-device synchronous reminder mechanism may also be referred to as simultaneous vibration.

After the incoming call is answered or hung up, other devices can stop simultaneous vibration in time. In this way, an inaccurate reminder function provided to the user is avoided.

SUMMARY

Embodiments of this application provide an incoming call reminder method and an electronic device, so that when an incoming call is answered or hung up, devices that provide simultaneous vibration can quit simultaneous vibration in a timely manner, so as to avoid an error prompt to a user.

To achieve the foregoing objective, the following technical solutions are used in the embodiments of this application.

According to a first aspect, an incoming call reminder method is provided, applied to a first electronic device, where the first electronic device is communicatively connected to a second electronic device, and the method includes: in response to an incoming call received by the first electronic device, entering, by the first electronic device, an incoming call ringing state, where the incoming call ringing state is used to remind a user of the incoming call: when the first electronic device is in the incoming call ringing state, receiving, by the first electronic device, a first heartbeat packet sent by the second electronic device; and sending, by the first electronic device, a first heartbeat response to the second electronic device, where the first heartbeat response is used to keep the incoming call ringing state after the second electronic receives the first heartbeat response, and the second electronic is in the incoming call ringing state when sending the first heartbeat packet. The communicative connection between the first electronic device and the second electronic device may mean that the first electronic device and the second electronic device are in a same local area network, and/or the first electronic device and the second electronic device log in to a same account. In this way, interaction of the first heartbeat packet enables the first electronic device to transfer a current incoming call ringing state to another simultaneous vibration device, so that the another simultaneous vibration device can continue to accurately provide simultaneous vibration.

In a possible design, the method further includes: when the first electronic device is in a non-incoming call ringing state, receiving, by the first electronic device, a second heartbeat packet sent by the second electronic device, where the second electronic device is in the incoming call ringing state when sending the second heartbeat packet; and in response to receiving the second heartbeat packet, skipping sending, by the first electronic device, a second heartbeat response to the second electronic device, so that the second device exits the incoming call ringing state. In this way, by using a mechanism in which a heartbeat response is not received when times out, the second device can learn that the first device is no longer in the incoming call ringing state. Correspondingly, the second device may exit the incoming call ringing state, or may be referred to as stopping incoming call ringing, or may be referred to as stopping the incoming call ringing state. It should be noted that, in this embodiment of this application, exiting the incoming call ringing state may also be referred to as entering a non-incoming call ringing state. The non-incoming call ringing state may include answering the incoming call or hanging up the incoming call. The hanging up the incoming call may be a direct hanging up without answering the incoming call.

In a possible design, the entering, by the first electronic device, an incoming call ringing state includes: reminding, by the first electronic device, the user of the incoming call in any one of the following manners: displaying, on a display screen, an incoming call interface corresponding to the incoming call, a ringing prompt, and a vibration prompt. In this way, a form in which the first electronic device provides simultaneous vibration is specified, and therefore, an incoming call reminder is provided for the user.

In a possible design, before the sending, by the first electronic device, a first heartbeat response to the second electronic device, the method further includes: determining that a current call status is the incoming call ringing state. In this way, the first electronic device may respond to the first heartbeat packet according to the current call status.

In a possible design, the method further includes: generating a simultaneous vibration decision request according to the current incoming call, where the simultaneous vibration decision request is used to obtain a list of simultaneous vibration devices, and when the list of simultaneous vibration devices is not empty, the list of simultaneous vibration devices includes device information of at least one second electronic device: where the device information includes a device ID and/or a communication address of the second electronic device; obtaining the list of simultaneous vibration devices: generating simultaneous vibration information according to the list of simultaneous vibration devices when the list of simultaneous vibration devices is not empty, where the simultaneous vibration information is used to indicate at least one second electronic device in the list of simultaneous vibration devices to perform simultaneous vibration; and sending the simultaneous vibration information. In this way, by using the stored list of simultaneous vibration devices, the first electronic device may determine whether a device that requires simultaneous vibration exists. If the device exists, the first electronic device may indicate, by using the simultaneous vibration information, another device to perform simultaneous vibration.

In a possible design, the list of simultaneous vibration devices is disposed in a memory of the first electronic device, and the method further includes: if the first electronic device logs in to a first account, when the first electronic device accesses a local area network, searching for, by the first electronic device, whether a second electronic device that logs in to the first account exists in the local area network, and if the second electronic device exists, storing device information of the second electronic device into the list of simultaneous vibration devices; and/or if the first electronic device has accessed the local area network, when the first electronic device logs in to the first account, searching the local area network for whether a second electronic device that logs in to the first account exists, and if the second electronic device exists, storing device information of the second electronic device into the list of simultaneous vibration devices. In this way, by determining on the local area network and account, the device that requires simultaneous vibration can be selected.

In a possible design, before the generating simultaneous vibration information, the method further includes: sending, by the first electronic device, a communication acknowledgement message to at least one second electronic device in the list of simultaneous vibration devices, where the communication acknowledgement message is used to determine whether the second electronic device is online; and when a communication response message of the second electronic device for the communication acknowledgement message is received, generating the simultaneous vibration information. In this way, the simultaneous vibration information is generated and sent only when the simultaneous vibration device is online, so that only the online device provides simultaneous vibration. This makes a simultaneous vibration mechanism of a plurality of devices more reasonable.

In a possible design, the sending a first heartbeat response includes: sending the first heartbeat response within preset duration after the first heartbeat packet is received. In this way, high efficiency of heartbeat communication is ensured by using a time limit of the preset duration, and a state transfer mechanism in a case of sending when times out becomes possible.

According to a second aspect, an incoming call reminder method is provided, applied to a second electronic device, where the second electronic device is communicatively connected to a first electronic device, and the method includes: entering, by the second electronic device, an incoming call ringing state, where the incoming call ringing state corresponds to an incoming call received by the first electronic device, and the incoming call ringing state is used to remind a user of the incoming call; sending, by the second electronic device, a first heartbeat packet to the first electronic device; receiving, by the second electronic device, a first heartbeat response, where the first heartbeat response is sent by the first electronic device to the second electronic device after receiving the first heartbeat packet, and the first electronic device is in the incoming call ringing state when receiving the first heartbeat packet; and in response to receiving the first heartbeat response, maintaining, by the second electronic device, the incoming call ringing state. In this way, after simultaneous vibration starts, the current call status can be determined based on a heartbeat response by using a heartbeat mechanism, so as to quickly and accurately determine whether to continue to provide simultaneous vibration.

In a possible design, the method further includes: sending, by the second electronic device, a second heartbeat packet to the first electronic device, where the second electronic device is in the incoming call ringing state when sending the second heartbeat packet; and in response to that a second heartbeat response is not received within preset duration, stopping, by the second electronic device, the incoming call ringing state, where the first electronic device is in a non-incoming call ringing state when receiving the second heartbeat packet, and the second heartbeat response corresponds to the second heartbeat packet. In this way, by using a mechanism in which a heartbeat packet is not received when times out, the second electronic device can learn that the first device has exited the incoming call ringing state currently. Then, the second device can correspondingly exit the incoming call ringing state.

In a possible design, the entering, by the second electronic device, an incoming call ringing state includes: reminding, by the second electronic device, the user of the incoming call in any one of the following manners: displaying, on a display screen, an incoming call interface corresponding to the incoming call, a ringing prompt, and a vibration prompt.

In a possible design, the first electronic device and the second electronic device are located in a same local area network, and the first electronic device and the second electronic device log in to a same account.

In a possible design, before the entering, by the second electronic device, an incoming call ringing state, the method further includes: receiving simultaneous vibration information, where the simultaneous vibration information is used to indicate the second electronic device to enter the incoming call ringing state.

In a possible design, after the receiving simultaneous vibration information, the method further includes: generating, by the second electronic device, a decision request according to the simultaneous vibration information, where the decision request is used to determine whether the second electronic device is in a non-conflicting state; and when it is determined that the second electronic device is in the non-conflicting state, starting simultaneous vibration.

In a possible design, when the second electronic device is not in any one of the following states, determining that the second electronic device is in the non-conflicting state: in a conference, in multi-screen collaboration, in a video call, and do not disturb.

In this way, before providing the simultaneous vibration, the second electronic device may flexibly determine, according to a situation of the second electronic device, whether to provide simultaneous vibration. For example, in a do not disturb state, the second electronic device may not perform simultaneous vibration even if receiving simultaneous vibration information, so as to avoid unnecessary interference to the user.

In a possible design, the first heartbeat response is received within preset duration after the first heartbeat packet is sent.

In a possible design, the method further includes: after sending the second heartbeat packet, starting, by the second electronic device, timing until the preset duration ends.

In a possible design, that a second heartbeat response is not received within preset duration includes: before the timing ends, no second heartbeat response corresponding to the second heartbeat packet is received.

In a possible design, before the second heartbeat response is not received within the preset duration, the method includes: sending a third heartbeat packet to the first electronic device, where the second electronic device is in the incoming call ringing state when sending the third heartbeat packet; and not receiving a third heartbeat response corresponding to the third heartbeat packet within the preset duration.

According to a third aspect, an incoming call reminder method is provided and is applied to a system including a first electronic device and a second electronic device, where the method includes: in response to an incoming call received by the first electronic device, entering, by the first electronic device, an incoming call ringing state, and entering, by the second electronic device, an incoming call ringing state corresponding to the incoming call, where the incoming call ringing state is used to remind a user of the incoming call: sending, by the second electronic device, a first heartbeat packet to the first electronic device; when the first electronic device is in the incoming call ringing state, receiving, by the first electronic device, a first heartbeat packet sent by the second electronic device; and sending, by the first electronic device, a first heartbeat response to the second electronic device in response to receiving the first heartbeat packet; and in response to receiving the first heartbeat response, maintaining, by the second electronic device, the incoming call ringing state.

In a possible design, the method further includes: sending, by the second electronic device, a second heartbeat packet to the first electronic device; when the first electronic device is in a non-incoming call ringing state, receiving, by the first electronic device, the second heartbeat packet sent by the second electronic device; in response to receiving the second heartbeat packet, skipping sending, by the first electronic device, a second heartbeat response to the second electronic device; and stopping, by the second electronic device, the incoming call ringing state in response to that the second heartbeat response is not received within preset duration.

According to a fourth aspect, an electronic device is provided. The electronic device includes one or more processors and one or more memories. The one or more memories are coupled to the one or more processors, and the one or more memories store computer instructions. When the one or more processors execute the computer instructions, the electronic device performs the incoming call reminder method provided in the first aspect and any possible design thereof.

It should be understood that the technical solution provided in the fourth aspect may be corresponding to the incoming call reminder method provided in the first aspect and the example. Therefore, beneficial effects can be achieved are similar, and details are not described herein again.

According to a fifth aspect, an electronic device is provided. The electronic device includes one or more processors and one or more memories. The one or more memories are coupled to the one or more processors, and the one or more memories store computer instructions. When the one or more processors execute the computer instructions, the electronic device performs the incoming call reminder method provided in the second aspect and any possible design thereof.

It should be understood that the technical solution provided in the fifth aspect may be corresponding to the incoming call reminder method provided in the second aspect and the example. Therefore, beneficial effects can be achieved are similar, and details are not described herein again.

According to a sixth aspect, a communication system is provided, where the communication system includes the electronic device provided in the fourth aspect and the electronic device provided in the fifth aspect.

According to a seventh aspect, a computer readable storage medium is provided, including computer instructions. When the computer instructions run on an electronic device, the electronic device performs the incoming call reminder method provided in the first aspect and any possible design thereof, or performs the incoming call reminder method provided in the second aspect and any possible design thereof.

According to an eighth aspect, a chip system is provided, where the chip system includes an interface circuit and a processor. The interface circuit and the processor are interconnected by using a line. The interface circuit is configured to receive a signal from the memory and send the signal to the processor. The signal includes computer instructions stored in the memory. When the processor executes the computer instructions, the chip system performs the incoming call reminder method provided in the first aspect and any possible design thereof, or performs the incoming call reminder method provided in the second aspect and any possible design thereof.

It should be understood that the technical solutions provided in the sixth aspect to the eighth aspect may be corresponding to the call reminder method provided in the foregoing design. Therefore, beneficial effects can be achieved are similar, and details are not described herein again.

DESCRIPTION OF EMBODIMENTS

Figure 1:
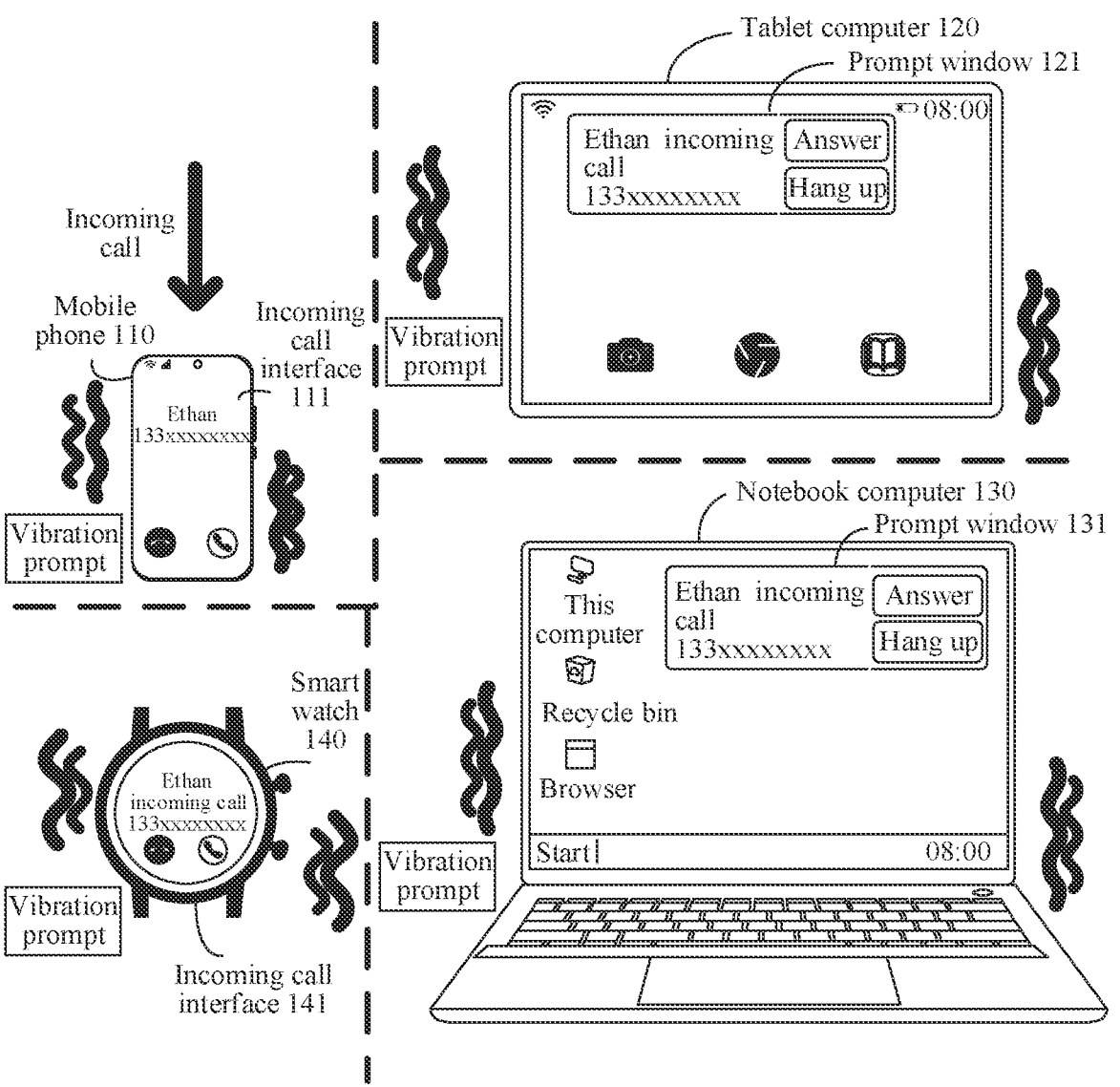
FIG. 1 is a schematic diagram of multi-device simultaneous vibration.

With development of communication technologies, there are more and more electronic devices that provide various functions for a user. For example, these electronic devices may include a mobile phone, a tablet computer, a notebook computer, a smart watch, and the like. For ease of description, the electronic device is referred to as a device in the following.

Different devices may provide a coordinated function to a user by means of communicative connections. The plurality of devices that provide the coordinated function may be referred to as coordinated devices. In some implementations, the plurality of coordinated devices may include one master device. When the plurality of devices work together, the master device may serve as a master control end (for example, a server end) to coordinate work of each coordinated device. For example, the master device may be a mobile phone of the user. Correspondingly, another coordinated device may serve as a controlled end (for example, a client end), and provides the coordinated function under an indication of the server end device. In some cases, a coordinated system formed by the server end device and one or more client end devices may also be referred to as a 1+8 coordinated system. "1" may be used to indicate the server end device, and "8" may be used to indicate plurality of client end devices.

Based on the coordinated function, secure sharing of data information may be implemented between the coordinated devices, so as to provide the user with more convenient use experience. For example, the coordinated function may include a coordinated voice call function. Based on the coordinated voice call function, when a device receives an incoming call, another coordinated device may synchronously remind incoming call information of the incoming call, and perform a virtual call instead of the device that receives the incoming call.

For example, the coordinated devices of the user include a mobile phone, a tablet computer, a notebook computer, and a smart watch. The mobile phone may be a server end device, and other devices (such as a tablet computer, a notebook computer, and a smart watch) may be client end devices.

The coordinated voice call function may be provided when the mobile phone, the tablet computer, the notebook computer, and the smart watch determine, under authorization of the user, that a condition is met. The meeting a condition may include: The mobile phone, the tablet computer, the notebook computer, and the smart watch are in a connected state. For example, in some embodiments, the connected state may be a communicative connection implemented by using a "touch to connect" function provided by each device. In some other embodiments, when plurality of devices are connected to a same local area network, if each device logs in to a same account, at least one of the devices (such as each device) may obtain information of another device in a self-discovery manner, and establish a communicative connection with these devices that are in the same local area network and log in to the same account.

Once any two devices implement a communicative connection, a corresponding trust relationship may be stored in one or more devices. The trust relationship may be stored in a trust list of a device. For example, after a communicative connection is implemented between the mobile phone and the notebook computer by using the "touch to connect" function, a trust list may be separately stored in the mobile phone and the notebook computer. The mobile phone is used as an example. The trust list of the mobile phone may store a trust relationship corresponding to the notebook computer. Similarly, the notebook computer is used as an example. A trust list of the notebook computer may store a trust relationship corresponding to the mobile phone. Therefore, when the mobile phone and the notebook computer are located in a same local area network in the future, the two devices may be directly communicatively connected to implement data interaction. Therefore, when the mobile phone and the notebook computer are located in a same local area network in the future, the two devices may be directly communicatively connected to implement data interaction. Other devices may also store similar trust relationships, so as to implement coordinated functions of a plurality of devices.

A coordinated voice call function in the coordinated functions is used as an example. FIG. 1 is a schematic diagram of a scenario in which a coordinated function is provided for a plurality of devices. The scenario may include a mobile phone 110, a tablet computer 120, a notebook computer 130, and a smart watch 140. The mobile phone 110, the tablet computer 120, the notebook computer 130, and the smart watch 140 have established a communicative connection that is used to provide a coordinated function. The mobile phone 110 has a voice communication function for answering a call or making a call. The voice communication function may be a voice communication function based on a voice network (such as 2G or 3G), or may be a voice communication function based on a data network (such as VoLTE or VoNR). In this example, a display screen may be disposed on another device (such as the tablet computer 120, the notebook computer 130, and the smart watch 140), and a display function can be provided to a user.

In this example, after an incoming call is received, until the user answers or hangs up, the mobile phone 110 may display an incoming call interface 111, and the incoming call interface 111 may include incoming call information, for example, information such as an incoming call number and an incoming call contact, so as to prompt the user. In some implementations, the mobile phone 110 may further prompt, by means of vibration, the user of the incoming call. An effect of the vibration may be provided by a vibration motor in the mobile phone.

Correspondingly, in a process in which the mobile phone 110 prompts the user of the incoming call, the coordinated voice call function may be used to indicate another device to remind the user of the incoming call. For example, a top display prompt window 121 may be disposed on the tablet computer 120. The prompt window 121 may also include the incoming call information, such as the incoming call number and the incoming call contact, so as to remind the user of the current incoming call. Similarly, for the notebook computer 130, a top display prompt window 131 may be disposed on the notebook computer 130. The prompt window 131 may also include the incoming call information, so as to remind the user of the current incoming call. For the smart watch 140, an incoming call interface 141 may be displayed on the smart watch 140. The incoming call interface 141 may also include the incoming call information, so as to remind the user of the current incoming call.

In this example, when each device reminds the user of the current incoming call by using an interface, the device may further remind the user in a form of vibration that the current incoming call is not processed (for example, answered or hung up). In this application, a case in which the plurality of devices remind the user by means of vibration may also be referred to as a case in which the plurality of devices are in a simultaneous vibration state, or the plurality of devices perform simultaneous vibration. It may be understood that the simultaneous vibration state may include at least one of the following: ringing, vibration, interface prompt, and the like. By working in the simultaneous vibration state, the coordinated device can synchronously remind the user of the current incoming call.

Figure 2:
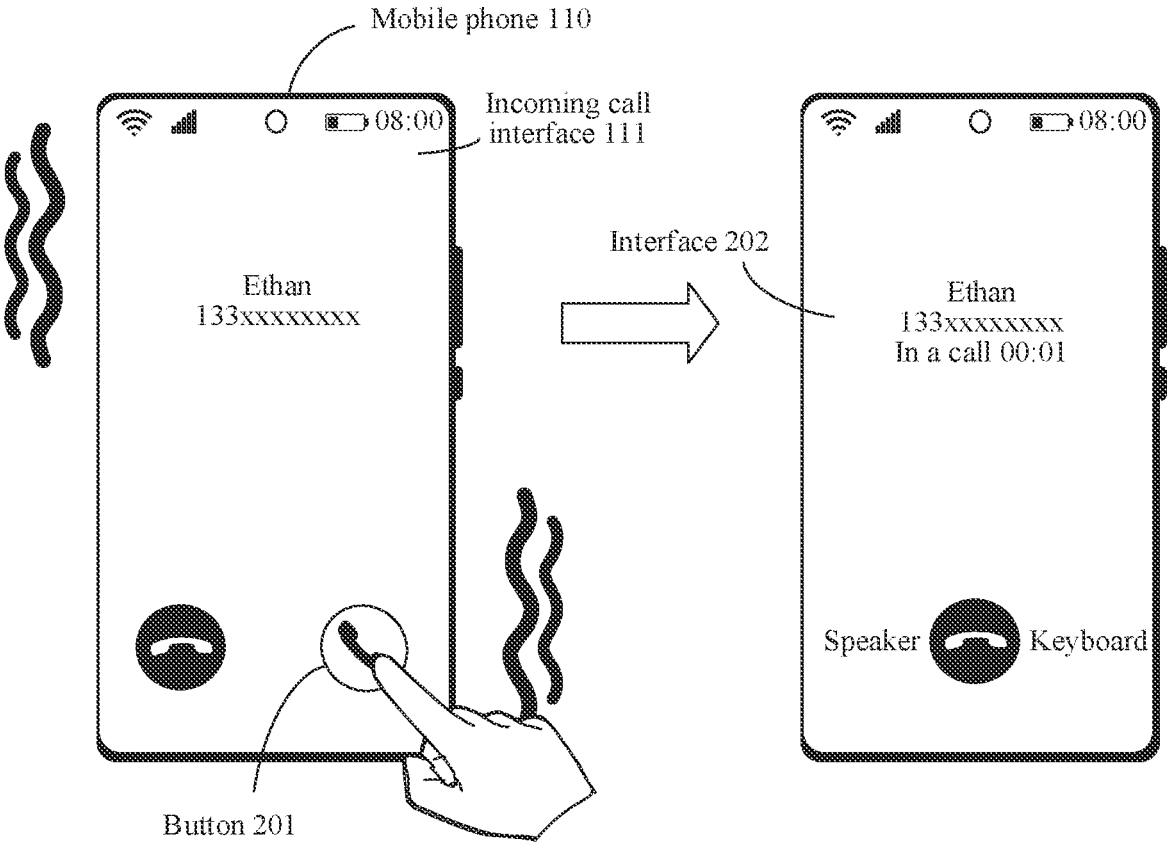
FIG. 2 is a schematic diagram of incoming call answering.

Correspondingly, the user may perform an operation on the device to indicate the device to answer or hang up the incoming call. For example, as shown in FIG. 2, the user may input an operation of answering the incoming call on the incoming call interface 111 of the mobile phone 110. The incoming call interface 111 may include a button 201, and the button 201 may be corresponding to a function of answering an incoming call. The user may input an operation such as tapping or sliding to the button 201, so as to indicate the mobile phone 110 to answer the incoming call. Correspondingly, the mobile phone 110 may answer the current incoming call, and jump to display a call interface, an interface 202 as shown in FIG. 2.

Figure 3:
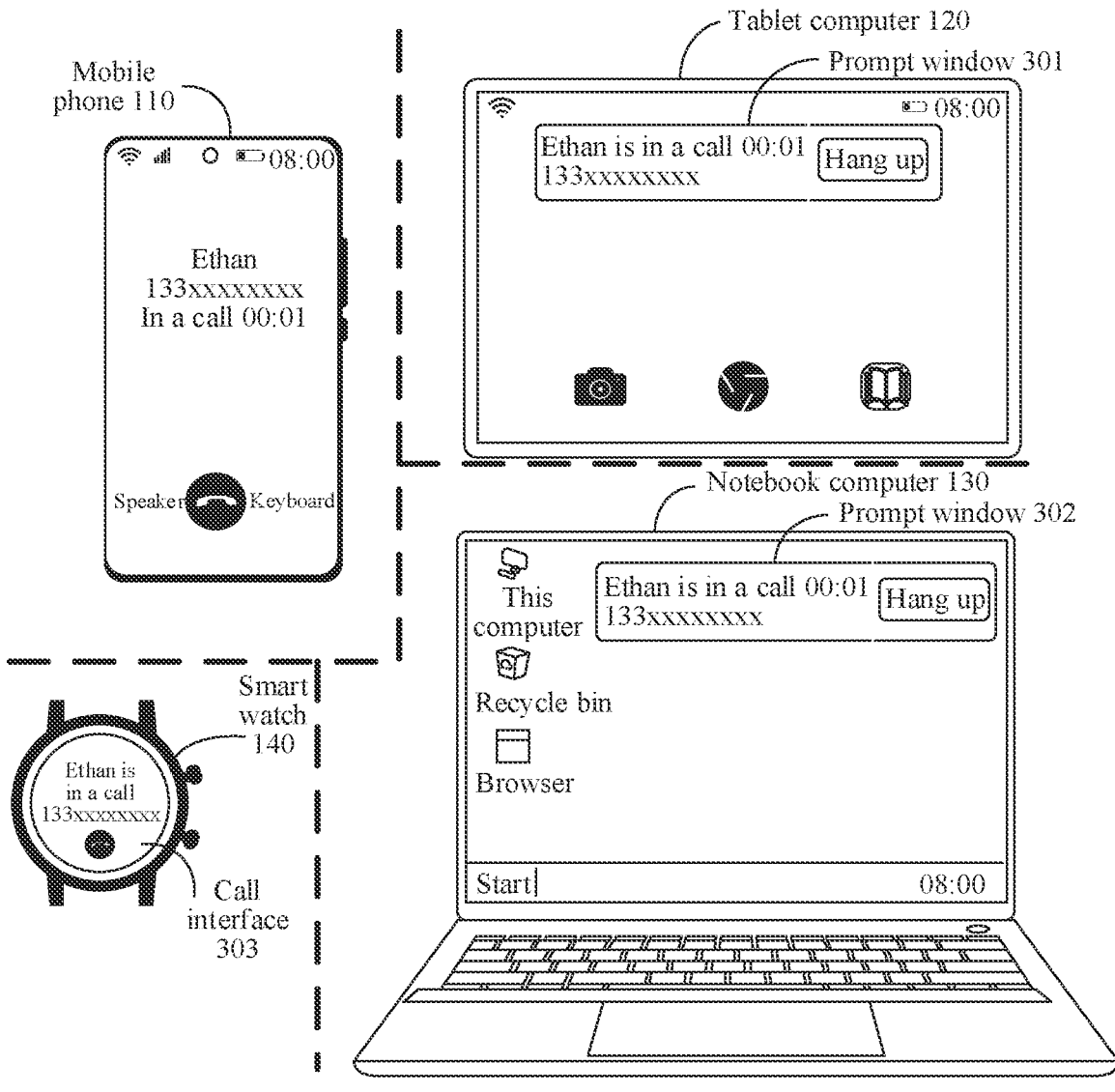
FIG. 3 is a schematic diagram of multi-device display after incoming call answering.

Correspondingly, other devices (such as the tablet computer 120, the notebook computer 130, and the smart watch 140) may also jump to a corresponding interface of the call. For example, as shown in FIG. 3, the tablet computer 120 may display current call information in the prompt window 301, such as call duration and an opposite-party number. This indicates that the current call has been answered and is in progress. Similarly, the notebook computer 130 may display the current call information in the prompt window 302. Therefore, it is identified that the current call has been answered and is in progress. The smart watch 140 may display the call interface 303. The call interface 303 may include current call information. Therefore, it is identified that the current call has been answered and is in progress.

It may be understood that in a case in which the call has been answered (or hung up), the mobile phone 110 may stop a vibration prompt. Similarly, the tablet computer 120, the notebook computer 130, and the smart watch 140 also need to stop vibrating accordingly. That is, after a call is answered or hung up, devices in a coordinated communication state need to exit the simultaneous vibration state.

To resolve the foregoing problem, an embodiment of this application provides a simultaneous vibration exit mechanism based on a heartbeat communication mechanism between each coordinated device, so that after a call is answered or hung up, the coordinated devices may separately exit simultaneous vibration. In this way, the coordinated function provided by the coordinated devices is more reasonable, and corresponding simultaneous vibration overheads (for example, power consumption overheads of motor vibration) is reduced.

The solution provided in this embodiment of this application may be applied to a scenario in which at least two devices are included. For example, the at least two devices may include a first device and a second device. The first device and the second device may jointly provide a coordinated voice call function, that is, the first device and the second device may be voice call coordinated devices, which are referred to as coordinated devices. Corresponding to the foregoing example, the first device may be a server end device, and the second device may be a client end device.

An example in which the voice call is a SIM card-based operator voice call is used. The first device may be provided with a SIM card, and can be configured to receive incoming call information from an operator. The second device may provide a coordinated voice call function in a state such as an incoming call state or a call state of the first device. For example, when an incoming call is not answered, the first device may display an incoming call interface, and vibrates to remind the user. Correspondingly, the second device may also display a corresponding incoming call interface (or an incoming call window), and vibrates to remind the user.

In different implementations, the first device and the second device may be the same, or may be different. For example, the first device may be a smartphone (a mobile phone for short), and the second device may be another intelligent terminal. In some other implementations, the first device and/or the second device may further be a device such as a mobile phone, a tablet computer, a notebook computer, a personal digital assistant (personal digital assistant. PDA), an augmented reality (augmented reality, AR)\virtual reality (virtual reality, VR) device, a media player, or the like. In some other implementations, the first device and/or the second device may further be a portable mobile device such as a smart watch.

In different implementations of this application, the first device and/or the second device may have different components.

For example, in some embodiments, the first device is used as an example from a perspective of hardware composition. The first device may include a processor, an external memory interface, an internal memory, a universal serial bus (universal serial bus. USB) interface, a charging management module, a power management module, a battery, an antenna 1, an antenna 2, a mobile communication module, a wireless communication module, an audio module, a sensor module, a key, a motor, an indicator, a camera, a display screen, and a subscriber identification module (subscriber identification module, SIM) card interface. The sensor module may include a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like. In some embodiments, the first device may further include devices such as a speaker, a receiver, a microphone, and a headset interface, which are used to implement audio-related functions of the electronic device.

It may be understood that the foregoing example does not constitute a specific limitation on the first device. In some other embodiments, the electronic device (for example, the first device or the second device) in this embodiment of this application may include more or fewer components, or combine some components, or split some components, or have different component arrangements.

In some other embodiments, from a perspective of software composition, an operating system may be running on an electronic device (for example, the first device and/or the second device) involved in an embodiment of this application. The operating system may be Windows®, Linux®, IOS®, Android®), or another operating system. The operating system may have a layered architecture. In the layered architecture, software is divided into several layers, and each layer has a clear role and task. The layers communicate with each other by using software interfaces.

In an example, the Android® (Android®) operating system running on the first device is used as an example. With reference to the example in FIG. 4, the first device may have a layered architecture. From top to bottom, the layered architecture includes an application layer (Application layer, abbreviated as an APP layer or an application layer), an application framework layer (Application Framework layer, abbreviated as a Framework layer or a framework layer), a hardware abstraction layer (Hardware Abstraction layer, abbreviated as an HAL layer), and a hardware layer.

The application layer may include a series of application packages. The application packages may include applications such as Camera, Gallery, Calendar, Phone, Map, Navigation, Bluetooth, Music, Videos, and Messages. In this example, the application layer may include a call application that provides a call function, such as a first call application.

The framework layer provides application programming interfaces and programming frameworks for applications at the application layer. The framework layer includes some predefined functions. The framework layer may include a window manager, a content provider, a view system, a resource manager, a notification manager, an activity manager, an input manager, and the like. The window manager provides a window manager service (Window Manager Service, WMS), which can be used for window management, window animation management, surface manager (surface manager), and serve as a transfer station of an input system. The content provider is configured to store and obtain data, and enable the data to be accessible to an application. The data may include videos, images, audio, calls that are made and received, browsing history and bookmarks, a phone book, and the like. The view system includes a visual control, and the view system may be configured to build an application. A display interface may include one or more views. The resource manager provides various resources for an application. The notification manager enables the application to display notification information in a status bar, and may be configured to convey a notification-type message. The displayed notification information may automatically disappear after a short stay without user interaction. The notification manager may alternatively be a notification that appears in a top status bar of the system in a form of a graph or scroll bar text. The activity manager may provide an activity manager service (Activity Manager Service, AMS), and the AMS may be used to start, switch, and schedule system components (such as an activity, a service, a content provider, and a broadcast receiver), and manage and schedule application processes. The input manager may provide an input manager service (Input Manager Service, IMS), and the IMS may be used to manage system input, for example, touchscreen input button input, and sensor input. The IMS obtains an event from an input device node, and assigns the event to an appropriate window through interaction with the WMS.

Figure 4:
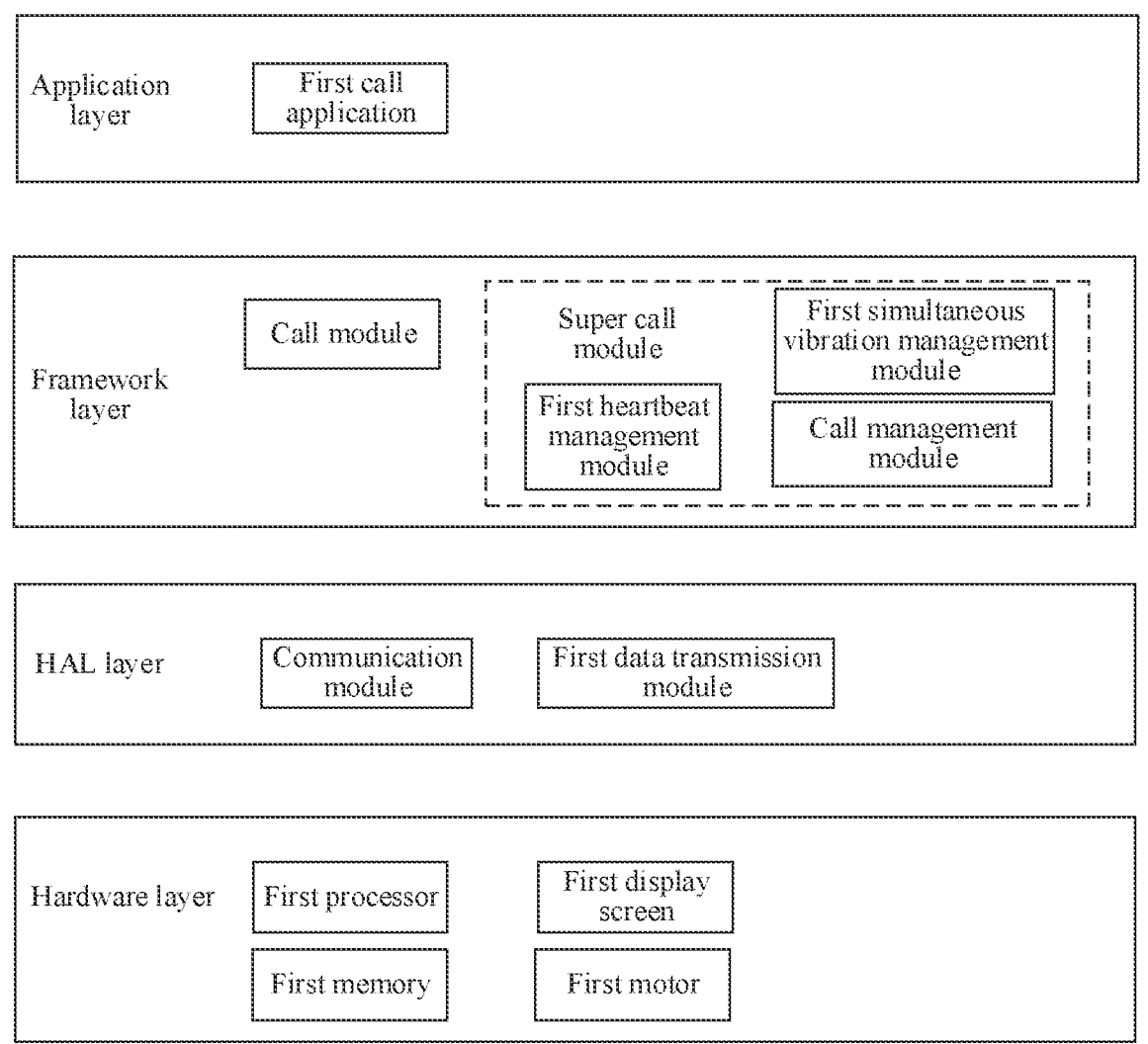
FIG. 4 is a schematic diagram of composition of a first electronic device according to an embodiment of this application.

In this embodiment of this application, another function module may further be disposed in the framework layer, so as to support various functions of the first device. As shown in FIG. 4, a call module may be disposed at the framework layer. The call module may be configured to support the call function corresponding to the first call application. As an example, the call module may implement corresponding processing of the call function at the framework layer by using one or more services. For example, the call module may implement functions of the call module by using TeleService and TeleComm. For example, when the first device receives incoming call information, TeleService may transmit the incoming call information to TeleComm, and TeleComm may transmit the incoming call information to the first call application. Therefore, the first call application may respond to the incoming call information, for example, indicate the first device to display an incoming call interface, and indicate the first device to prompt, by means of ringing/vibration, the user that the incoming call is not processed.

A super call module may also be disposed in the framework layer. The super call module may include a plurality of function modules, configured to implement multi-device coordination in a call process. For example, in this example, the super call module may include a call management module, a first simultaneous vibration management module, a first heartbeat management module, and the like. In some embodiments, a process corresponding to the super call module may start running itself when the first device starts, so as to provide a subsequent coordinated function.

The call management module may be InCallService. The call management module can provide a call status management function for the super call module. For example, when the first device receives the incoming call information, the call management module may obtain the corresponding call information from TeleComm. The call information may include a call status, such as incoming call ringing, answered, and hung up. Therefore, the super call module may implement corresponding multi-device coordinated voice call control based on the current call information obtained by the call management module.

The first simultaneous vibration management module may be configured to manage a multi-device simultaneous vibration mechanism. For example, when incoming call ringing of the first device occurs, the first simultaneous vibration module may indicate, in a case in which coordinated devices exist, the coordinated devices to perform simultaneous vibration. For example, the first simultaneous vibration management module may be configured to obtain a list of simultaneous vibration devices, so as to determine situations of coordinated devices. For another example, the first simultaneous vibration management module may perform a coordinated communication test with each coordinated device (for example, each second device in the list) in the list of simultaneous vibration devices, and determine a second device (that is, an online second device) through which the test succeeds as a coordinated device that can perform simultaneous vibration.

It should be noted that, in this embodiment of this application, that a multi-device voice coordination function corresponds to multi-device simultaneous vibration is used as an example. In some other embodiments, the multi-device voice coordination function may also include an interface prompt, a ringing prompt, and the like of a plurality of devices. The implementation mechanisms are similar and can be mutually referenced.

The first heartbeat management module may be configured to manage feedback for a heartbeat packet. In this application, another coordinated device that is different from the first device may send a heartbeat packet to the first device after receiving the simultaneous vibration information, so as to query a current call status. The first heartbeat management module may be configured to manage feedback for the heartbeat packet. For example, when the first device is still in the incoming call ringing state, the first device may send heartbeat packet response information to the another coordinated device by using the first heartbeat management module, so that the another coordinated device learns that ringing is still being performed currently, and continues to perform simultaneous vibration. For another example, when the current state is no longer in the incoming call ringing state, the first heartbeat management module of the first device may not respond to the received heartbeat packet, so that the another coordinated device stops simultaneous vibration when no feedback for the heartbeat packet is received within preset duration. For example, the preset duration may be set to 200 ms.

In this example, the HAL layer may run in a user space (user space), encapsulate a driver, and provide an invoking interface to an upper layer. For example, a communication module and a first data transmission module may be disposed at the HAL layer. The communication module may be configured to cooperate with the call module in the framework layer to provide a voice call service for the first call application. For example, the communication module may be corresponding to a communication component such as a modem (modem) of the first device. Therefore, an internal mechanism for receiving an incoming call signal by the first device may be briefly described as follows: The communication module receives an incoming call signal, and transmits the incoming call signal to the call module. The call module transmits the incoming call signal to the first call application for processing.

In this example, the first data transmission module at the HAL layer may implement data transmission between the first device and another coordinated device. For example, data such as simultaneous vibration information, a heartbeat packet, and a heartbeat packet response may be transmitted by using the first data transmission module.

As shown in FIG. 4, the first device may further include a hardware layer. The hardware layer may include hardware components configured to implement various functions. For example, the hardware layer may include a first processor configured to perform instruction control and delivery, a first display screen configured to perform image display (for example, incoming call interface display), a first memory configured to provide a storage capability, and a first motor configured to provide a vibration prompt. In some embodiments, a memory of the first device may store a corresponding trust list, and the trust list may include information about another device in a coordinated relationship with the first device (which may also be referred to as device information), for example, a device ID of the second device, a communication address, and the like. By querying the trust list, the first device can learn of a device that can perform simultaneous vibration.

It should be noted that, the composition of the first device shown in FIG. 4 may also be applied to the second device. In addition, the foregoing software composition in FIG. 4 does not constitute a limitation on the first device and/or the second device. In some other embodiments, the first device and/or the second device may further have more or fewer modules or components. The composition of the first device and/or the second device is not limited in this embodiment of this application.

Figure 5:
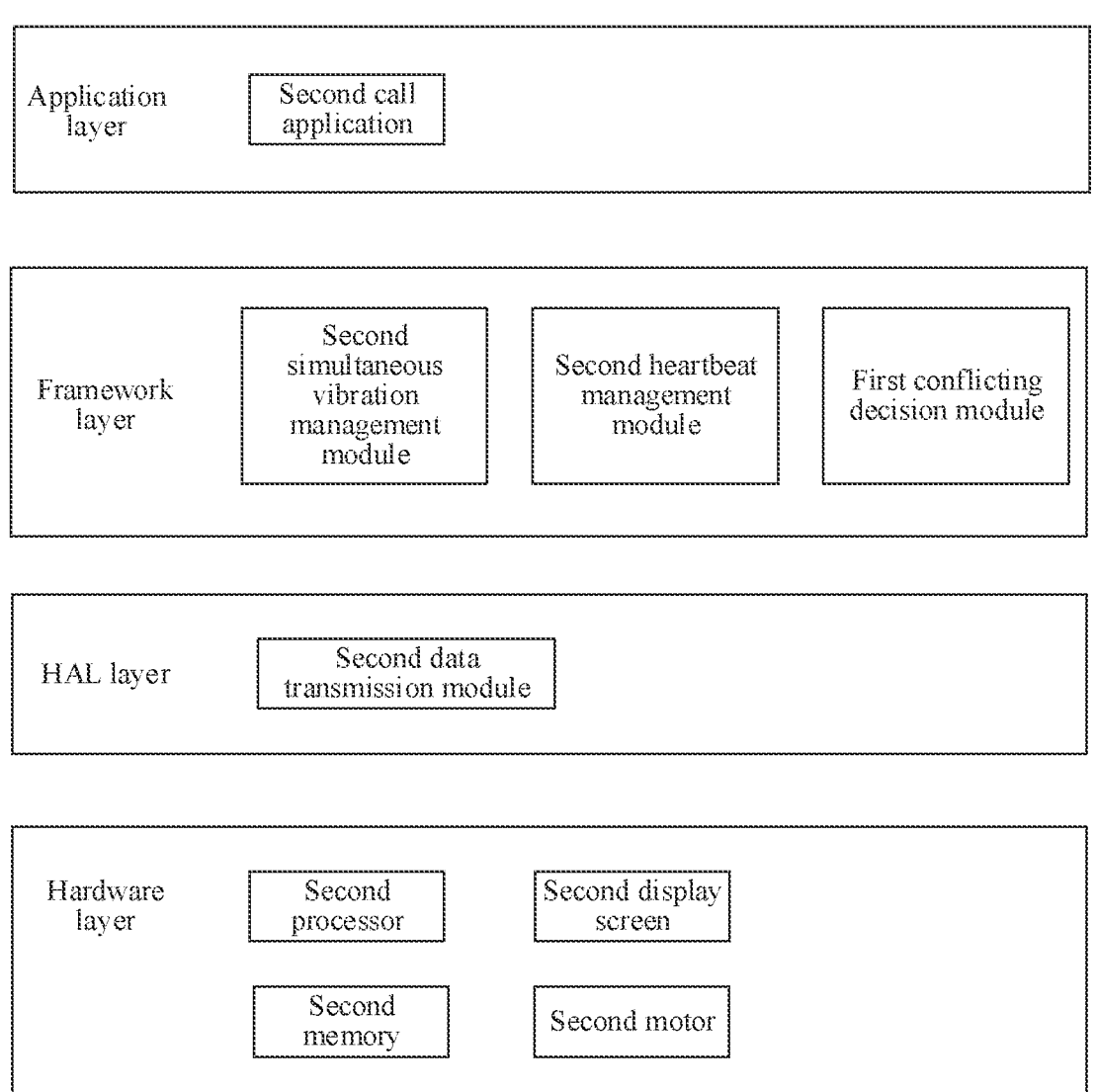
FIG. 5 is a schematic diagram of composition of a second electronic device according to an embodiment of this application.

In an example, FIG. 5 is a software composition of another electronic device according to an embodiment of this application. In some embodiments, the composition shown in FIG. 5 may be applied to the second device.

As shown in FIG. 5, in this example, the second device may have a layered architecture. From top to bottom, the layered architecture includes an application layer, a framework layer, an HAL layer, and a hardware layer.

With reference to the description in FIG. 4, in this example, the second device may be used as the client end device, and may have a more compact configuration than the first device.

For example, a second call application may be disposed at the application layer, and the second call application may be corresponding to the first call application in the example shown in FIG. 4.

With reference to the foregoing description, the second device may cooperate with the first device to provide a coordinated function, for example, provide a coordinated voice call function. That is, in some embodiments, the second device may not need to provide an independent incoming call signal to provide an independent call capability. Therefore, a call module may not be disposed at the framework layer of the second device shown in FIG. 5. In this way, the modules in the second device are reduced.

As shown in FIG. 5, modules such as a second simultaneous vibration management module, a second heartbeat management module, and a first conflicting decision module may be disposed at the framework layer of the second device.

The second simultaneous vibration management module may be corresponding to the first simultaneous vibration management module shown in FIG. 4. The second simultaneous vibration management module may be configured to control and adjust simultaneous vibration of the second device. For example, if it is determined that the first device is ringing after receiving an incoming call, the second simultaneous vibration management module may control the second device to perform simultaneous vibration, and remind the user of the incoming call. For another example, if it is determined that an incoming call of the first device has been answered or hung up, the second simultaneous vibration management module may control the second device to stop simultaneous vibration.

The second heartbeat management module may be corresponding to the first heartbeat management module shown in FIG. 4. The second heartbeat management module may implement heartbeat communication between devices with the heartbeat management module of the first device. In this example, the heartbeat communication may be used to determine whether the second device currently needs to continue to perform simultaneous vibration. For example, after the second device determines to start simultaneous vibration, the second heartbeat management module may send a heartbeat packet to the first device under control of the second device, so that when a response to the heartbeat packet from the first device is received, it is determined that the second device needs to continue to perform simultaneous vibration. Alternatively, when no response of the heartbeat packet is received within preset duration, it is determined that the second device needs to stop performing simultaneous vibration or the like.

The first conflicting decision module may further be disposed in the framework layer of the second device shown in FIG. 5. The first conflicting decision module may provide a policy reference for the second device for whether to perform simultaneous vibration. For example, the first conflicting decision module may collect and determine whether the current state of the second device is a conflicting state. The conflicting state may include a state such as in a conference, in a video call, in multi-screen collaboration, and do not disturb. That is, in the conflicting state, the second device may not provide a coordinated function of simultaneous vibration, so as to avoid interference to a function that is being provided by the second device. In this example, the first conflicting decision module may pre-store a list of conflicting states. After receiving the simultaneous vibration information from the first device, the second device may determine, by using the first conflicting decision module, whether the current state is the conflicting state before the simultaneous vibration function is provided. The second device may provide a simultaneous vibration function when determining that the current state is not the conflicting state. In this embodiment of this application, providing the simultaneous vibration function may also be referred to as starting simultaneous vibration. If the simultaneous vibration function is no longer provided, it may be referred to as stopping simultaneous vibration.

In software division of the second device provided in this example, the HAL layer may include a second data transmission module. The hardware layer may include components such as a second processor, a second display screen, a second memory, and a second motor. The setting of the modules of the HAL layer and the hardware layer in the second device may be corresponding to the setting of the modules of the HAL layer and the hardware layer in the first device shown in FIG. 4, and functions thereof may be mutually referenced. Details are not described herein again.

Figure 6:
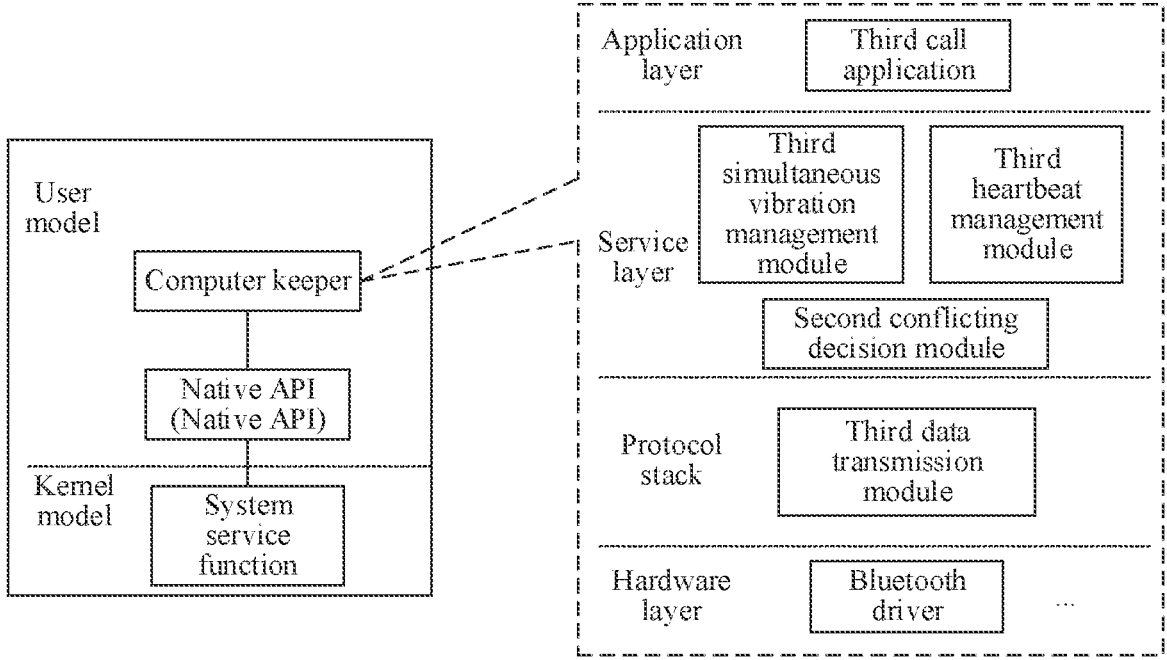
FIG. 6 is a schematic diagram of composition of another second electronic device according to an embodiment of this application.

In the foregoing examples in FIG. 4 and FIG. 5, the Android® (Android®) operating system running on the first device and/or the second device is used as an example. In some other embodiments of this application, the first device and/or the second device may further run another operating system. For example, the Windows® operating system running on the second device is used as an example. FIG. 6 shows a schematic composition of a second device. In a possible implementation, the second device may be a notebook computer shown in FIG. 1 or FIG. 3.

It should be noted that, a Windows® operating system in a computer is generally divided into a Kernel model (Kernel Model) and a user model (User Model).

Code running in kernel model may include core code that is secure and not maliciously attacked. Code (such as code of an application) running in the user model has relatively low security, and is vulnerable to attack. In some implementations, code running rights in the user model are limited, thereby improving system security. In addition, if an application performs some actions such as directly accessing a physical memory, a request needs to be made to the component in the kernel model. In this example, the kernel model may be corresponding to an operating system-level code running environment, and the user model may be corresponding to an application running environment.

In an implementation, the kernel model and the user model may be distributed in different privilege layers of a central processing unit (Central Processing Unit, CPU) of a computer to cope with different running requirements. The CPU has a plurality of privilege layers. For example, 386CPU of Intel® may include four privilege layers: from layer 0 to layer 3. Layer 0 has the highest privilege, that is, any code can be executed. Layer 3 has the lowest privilege, and only limited code can be executed. Then, the kernel model may run at layer 0 of the CPU, and the user model may run at layer 3 of the CPU.

In this example, the second device may provide various functions to the user by using the running Windows® operating system. For example, an application may be disposed in the user model. Different applications may be configured to provide different functions. The application may invoke software/hardware of the first device to implement respective functions by invoking each component in the kernel model.

As shown in FIG. 6, the user model and the kernel model may be disposed in the second device. As an upper layer, the user model can be installed with and run a plurality of applications. In this example, a set of applications may constitute the application layer. For example, a third call application may be disposed at the application layer. The third call application may be corresponding to the function of the second call application shown in FIG. 5.

In some embodiments, the user model in the second device may further include another component. For example, a subsystem corresponding to each application may be disposed in the user model, and the subsystem may include win32. POSIX, OS/2, and the like. When an application (for example, the third call application) runs, an application programming interface (Native Application Programming Interface, API) in a corresponding subsystem may be invoked to implement internal communication with the kernel model. For example, the application invokes an API function of the win32 subsystem, and the Win32 subsystem converts the API function into a native API (Native API). The Native API may be corresponding to a system service function, and the system service function may be transferred to a module that invokes a response in the kernel model to implement a corresponding function.

In this embodiment of this application, as shown in FIG. 6, a computer keeper application may be installed in the user model of the second device. The computer keeper may be configured to provide a coordinated function between the second device and another device (such as the first device).

As an example, the computer keeper application may also have a layered architecture. For example, the computer keeper application may include an application layer, a service layer, a protocol stack, and a hardware layer (HardWare).

A third call application may be installed in the application layer. A function of the third call application may be corresponding to the first call application or the second call application in the foregoing example. The service layer may include a third simultaneous vibration management module, a third heartbeat management module, and a second conflicting decision module. Functions of modules at the service layer may be corresponding to functions of modules at the framework layer shown in FIG. 5. A protocol stack may include a third data transmission module. Functions of modules in the protocol stack may be corresponding to functions of modules at the HAL layer shown in FIG. 5. In this example, one or more module drivers may be disposed at a hardware layer in the computer keeper. For example, a Bluetooth driver may be disposed at the hardware layer. When the computer keeper needs to invoke another module of the second device, a corresponding driver in the hardware layer may be used to invoke the another module.

In this way, the second device including software shown in FIG. 6 can implement functions of the client end device in a Windows® operating system environment. For example, the second device may cooperate with the first device to implement a coordinated voice call function. For example, the second device may perform simultaneous vibration in a process in which the first device rings. For another example, the second device may stop simultaneous vibration and the like when the first device answers the incoming call or hangs up the incoming call.

The first device involved in the solution provided in this embodiment of this application may have composition shown in FIG. 4. The second device may have composition shown in FIG. 4, FIG. 5, or FIG. 6. It should be understood that, compared with the examples shown in FIG. 5 and FIG.

6, each module in the composition shown in FIG. 4 further includes an independent call link and a call management module configured to manage a call. In some other embodiments of this application, the first device may also have a different Android® operating system from that shown in FIG. 4. In this case, modules shown in FIG. 4 may also be disposed in a corresponding operating system, so as to implement functions of the first device (that is, the server end device).

The following uses an example in which the first device has composition shown in FIG. 4, and the second device has composition shown in FIG. 5 to describe the simultaneous vibration solution provided in this embodiment of this application. Based on the solution provided in this embodiment of this application, by means of heartbeat communication, the client end device can conveniently and accurately execute simultaneous vibration or stop simultaneous vibration, thereby improving rationality of multi-device implementation in a coordinated voice call scenario and improving user experience.

Figure 7:
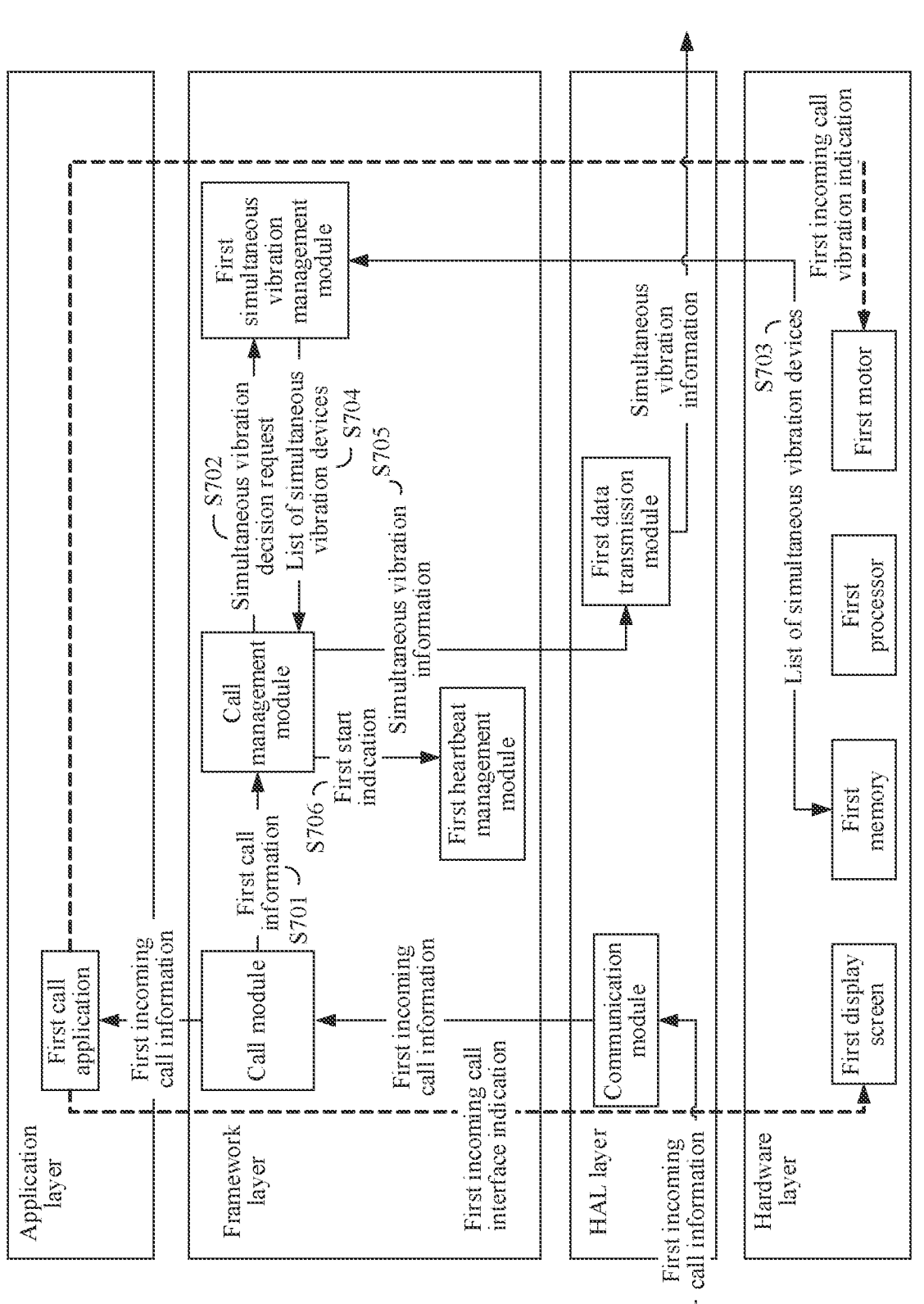
FIG. 7 is a schematic diagram of module interaction of an incoming call reminder method according to an embodiment of this application.

FIG. 7 is a schematic diagram of module interaction of an incoming call reminder method according to an embodiment of this application. The process may be applied to a first device (that is, a client end device). As described above, the first device may have a coordinated relationship with one or more other second devices. That is, the first device and one or more other second devices may jointly provide a coordinated function, such as a coordinated voice call function.

As shown in FIG. 7, the first device may receive first incoming call information by using a communication module (modem) of the first device.

For example, the first device may receive the first incoming call information by using the modem disposed at an HAL layer. Correspondingly, the communication module may transmit the first incoming call information to a call module at a framework layer. For example, the communication module may transmit the first incoming call information to TeleService of the call module, TeleService of the call module may transmit the first incoming call information to TeleComm of the call module, and TeleComm may transmit the first incoming call information to a first call application. In this way, the first call application may send an incoming call interface indication to a first display screen, so as to indicate the first display screen of the first device to display the incoming call. For example, the first call application may deliver a rendering instruction stream of an incoming call display interface, and the rendering instruction stream may be obtained by using a GPU in the first device by performing rendering. Then, the first display screen may display a corresponding incoming call interface according to the incoming call display interface. This reminds the user of the current incoming call. In this application, to remind the user of the incoming call, the first device may always display the incoming call display interface after receiving the first incoming call information and before answering or hanging up the incoming call. The process may be corresponding to an incoming call ringing state of the first device or an incoming call missed state of the first device. In addition, the first call application may further control a first motor of the first device to start working (for example, send an incoming call vibration indication to the first motor), so that the first device provides a vibration effect and reminds the user of the current incoming call. Certainly, in some embodiments, the first call application may also control an audio module (for example, a speaker in the audio module) of the first device to ring, to remind the user of the current incoming call.

In this example, the call management module in the first device may obtain the first call information from the call module (for example, perform S701). The first call information may be used to indicate related information of the current incoming call. For example, the first call information may include information such as a current incoming call number and an incoming call contact. In some embodiments, the first call information may further include a current call status. For example, different statuses of the current call may be distinguished by using one or more call identifiers. The call identifier may be a first identifier, a second identifier, or a third identifier. The first identifier may be used to indicate that the current call status is incoming call ringing. The second identifier may be used to indicate that the current call status is in a call. The third identifier may be used to indicate that the current call status is hung up. In this example, just after the first device receives the incoming call, the first call information may carry the first identifier, which is used to indicate that the current call status is incoming call ringing.

In an example, that the call management module includes InCallSevice is used as an example. After running. InCallSevice can automatically register callback of relevant call status changes such as incoming calls. In this case, the incoming call information is sent to TeleService by using the Modem and then to TeleComm to notify the first call application of the current incoming call. In addition, TeleComm may send the first call information to InCallSevice by using the callback function based on the foregoing registered callback mechanism.

After receiving the first call information, the call management module may communicate with the first simultaneous vibration management module to determine a current simultaneous vibration mechanism.

In some embodiments, in a case in which at least one second device exists, the first device may determine that the second device needs to be controlled to perform simultaneous vibration. In this example, the first memory of the first device may store information such as a device ID and a communication address of at least one second device that is in a coordinated relationship with the first device. In this case, the call management module may determine, according to the call management module, that a simultaneous vibration function is provided when the first device receives the incoming call.

For example, as shown in FIG. 7, the call management module may send a simultaneous vibration decision request to the first simultaneous vibration management module (for example, perform S702). In response to the simultaneous vibration decision request, the first simultaneous vibration management module may obtain a list of simultaneous vibration devices from the first memory (for example, perform S703). The list of simultaneous vibration devices may include information such as a device ID and a communication address of at least one second device. The first simultaneous vibration management module may send the list of simultaneous vibration devices to the call management module (for example, perform S704). Then, the call management module may determine, when determining that the list of simultaneous vibration devices is not empty, that simultaneous vibration may be initiated.

In some other embodiments, the first device may further determine, with reference to the list of simultaneous vibration devices and an online situation of the second device included in the list, whether to perform simultaneous vibration corresponding to the second device. The online situation of the second device may include online and offline. When the second device is online, the first device may perform coordinated communication with the second device. Then, when the first device receives the incoming call, the second device may perform simultaneous vibration of the incoming call. Correspondingly, when the second device is offline, the first device cannot perform coordinated communication with the second device. Therefore, when the first device receives the incoming call, the second device may not need to perform simultaneous vibration of the incoming call.

For example, after the foregoing S702-S704 are performed, in this example, the call management module may further send a communication acknowledgement message to each second device in the list of simultaneous vibration devices by using the first data transmission module. For example, the list of simultaneous vibration devices includes a second device A and a second device B. The call management module may send a communication acknowledgement message to the second device A by using the first data transmission module. When the second device A is online, the call management module of the first device may receive a communication response message from the second device A by using the first data transmission module. In this case, the first device may determine that the first device needs to perform simultaneous vibration with the second device A. Similarly, the call management module may send a communication acknowledgement message to the second device B by using the first data transmission module. When the second device B is offline, the call management module of the first device does not receive a communication response message from the second device B. In this case, the first device may determine that the first device does not need to perform simultaneous vibration with the second device B.

Therefore, whether the second device is online is determined, and simultaneous vibration is initiated on the online second device, so that the first device can reduce overheads of initiating simultaneous vibration on the offline second device.

In the following example, that the call management module determines that simultaneous vibration needs to be initiated to at least one second device is used as an example.

As shown in FIG. 7, the call management module may send, by using the first data transmission module, simultaneous vibration information to at least one second device that needs to initiate simultaneous vibration (for example, perform S705). The simultaneous vibration information is used to indicate the second device to initiate simultaneous vibration. In some embodiments, an example in which the first device is in incoming call ringing is used. The simultaneous vibration information may include information such as an incoming call number and an incoming call contact of the current incoming call.

It may be understood that when the call management module determines that simultaneous sending of the simultaneous vibration information to a plurality of second devices is required, the first data transmission module may separately send the simultaneous vibration information to the plurality of second devices.

Therefore, by using the solution shown in FIG. 7, the first device may send simultaneous vibration information to the second device during incoming call ringing, so as to indicate the second device to perform simultaneous vibration.

In this embodiment of this application, a heartbeat mechanism may be set in the first device, so that timing at which each coordinated device performs simultaneous vibration/stops simultaneous vibration is consistent. For example, after performing S704, the call management module may determine, according to device list information, that at least one second device needs to perform simultaneous vibration, and perform S706. For example, the call management module may send a first start indication to the first heartbeat management module. Therefore, the first heartbeat management module starts to work. Then, the first heartbeat management module may provide a heartbeat management function of the first device. For example, the first heartbeat management module may receive a heartbeat packet from the second device, and respond to the heartbeat packet in a process in which the first device is in incoming call ringing.

Based on the simultaneous vibration information sent in the solution shown in FIG. 7, the second device may respond accordingly.

Figure 8:
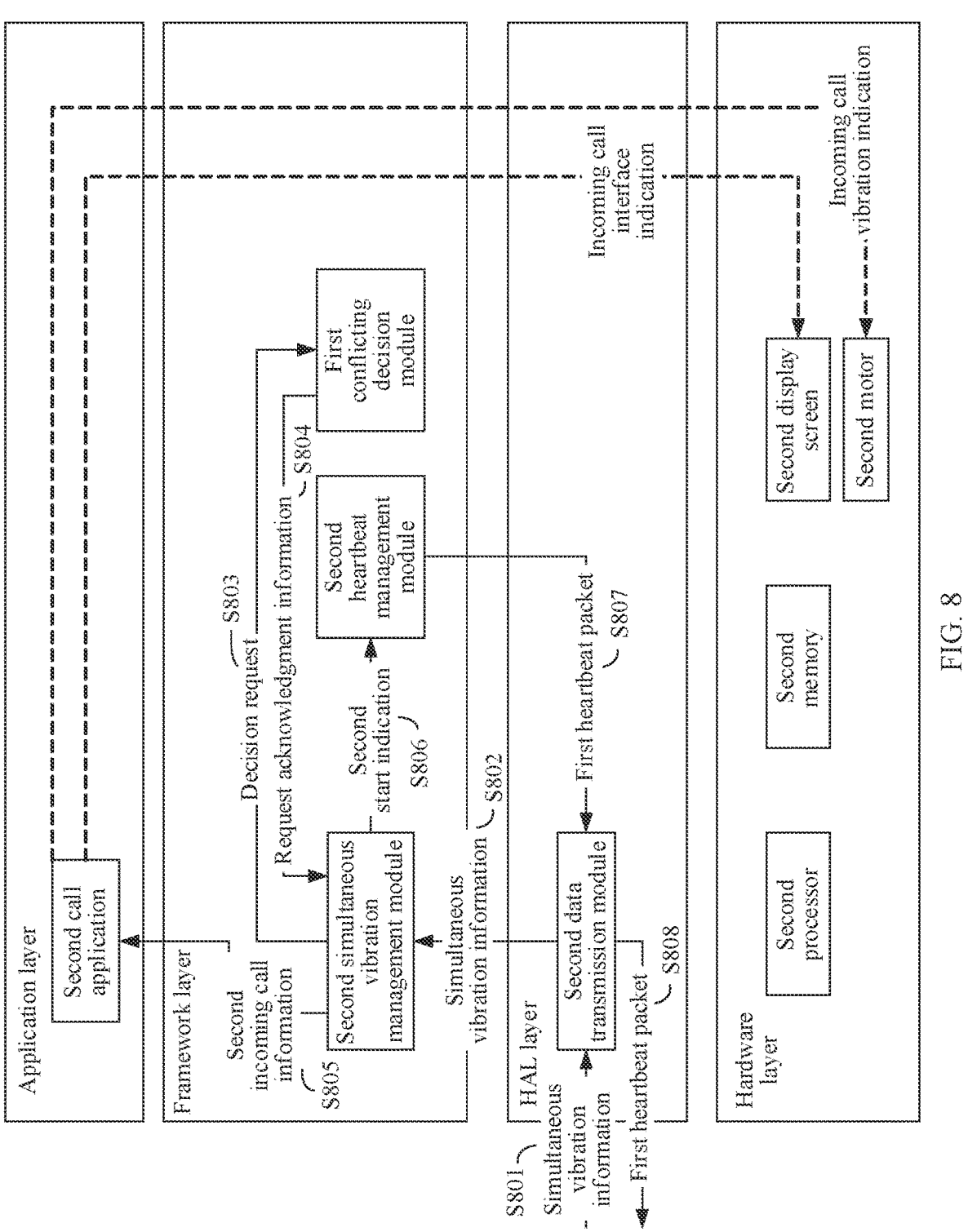
FIG. 8 is a schematic diagram of module interaction of another incoming call reminder method according to an embodiment of this application.

FIG. 8 is a schematic diagram of module interaction of another simultaneous vibration solution according to an embodiment of this application. The solution may be applied to the second device. In this solution, the second device can perform simultaneous vibration under an instruction of the first device to remind the user of the current incoming call.

As shown in FIG. 8, the second data transmission module of the second device may receive simultaneous vibration information from the first device (for example, perform S801). In some embodiments, the simultaneous vibration information may be the simultaneous vibration information sent in S705 shown in FIG. 7.

The second data transmission module may send the simultaneous vibration information to the second simultaneous vibration management module (for example, perform S802). In this way, the second simultaneous vibration management module can learn that the current first device receives an incoming call. In this case, the second simultaneous vibration management module may perform corresponding simultaneous vibration.

In this embodiment of this application, before performing simultaneous vibration, the second device may determine whether simultaneous vibration may be provided.

It should be understood that, as an independent electronic device, the second device may independently provide various functions for the user. For example, the second device may independently provide the user with functions such as a conference, multi-screen collaboration, and a video call. In some scenarios, the second device may also be set to do not disturb, so as to shield each notification, so as to avoid disturbing the user to perform other work. Therefore, when the first device receives an incoming call, the second device may not provide simultaneous vibration, otherwise affecting a current function. In this example, a state in which the second device cannot provide simultaneous vibration may be referred to as a conflicting state. The conflicting state may include a state in which the second device is in a conference, multi-screen collaboration, a video call, do not disturb, and the like.

Then, the second device may determine, according to whether the second device is currently in the conflicting state, to provide simultaneous vibration.

For example, after receiving the simultaneous vibration information, the second simultaneous vibration management module may send a decision request to the first conflicting decision module (for example, perform S803). The decision request may be used to request a decision whether simultaneous vibration is currently available. In this example, the conflicting decision module may also be corresponding to the first conflicting decision module shown in FIG. 5.

In response to the decision request, the first conflicting decision module may determine, according to a current state of the second device, whether to provide simultaneous vibration.

For example, a list of conflicting states may be stored in the first conflicting decision module. The list of conflicting states may include a conference state, a multi-screen collaboration state, a video call state, a do not disturb state, and another pre-stored state that cannot provide simultaneous vibration.

The first conflicting decision module may obtain the current state of the second device. In an implementation, the first conflicting decision module may obtain, from an activity manager of the second device, a device status indicated by each currently running process, so as to obtain the state of the second device. The first conflicting decision module may determine, according to whether the state of the second device is included in the list of conflicting states, whether the second device is currently in a conflicting state.

For example, when the state of the second device is included in the list of conflicting states, the first conflicting decision module determines that the second device currently does not provide simultaneous vibration.

For another example, when the state of the second device is not included in the list of conflicting states, the first conflicting decision module determines that the second device currently may provide simultaneous vibration.

For example, the second device may provide simultaneous vibration.

The first conflicting decision module may send request acknowledgement information to the second simultaneous vibration management module (for example, perform S804). The request acknowledgment information may be used to indicate that the second device is not in the conflicting state, and simultaneous vibration may be performed.

Correspondingly, the second simultaneous vibration management module may send the second incoming call information to the second call application (for example, perform S805). Therefore, the second call application may learn that the first device is during incoming call ringing. In some embodiments, the second incoming call information may include content related to the first incoming call information shown in FIG. 7. For example, the second incoming call information may include information such as an incoming call number and an incoming call contact. Incoming call content carried in the second incoming call information may be sent by the first device to the second device by using the simultaneous vibration information.

In some embodiments, after receiving the second incoming call information, the second call application may indicate, by using the incoming call interface indication, the second display screen of the second device to display the incoming call interface. In some other embodiments, after receiving the second incoming call information, the second call application may indicate, by using the incoming call vibration indication, the second motor of the second device to start working, and remind the user of the current incoming call by using vibration.

For the foregoing example, the second device may be any one of the tablet computer 120, the notebook computer 130, and the smart watch 140 as shown in FIG. 1. Correspondingly, the second call application may control the second device such as the tablet computer 120, the notebook computer 130, and/or the smart watch 140 shown in FIG. 1 to provide a corresponding incoming call reminder.

In this embodiment of this application, the second device may interact with the first device by using the heartbeat mechanism to update a current simultaneous vibration policy. For example, simultaneous vibration is continued, or simultaneous vibration is stopped.

For example, still referring to FIG. 8, after the second simultaneous vibration module determines, according to the request acknowledgment information, that simultaneous vibration may be performed, the second simultaneous vibration module may send a second start instruction to the second heartbeat management module of the second device (for example, perform S806). Therefore, the second heartbeat management module in the second device may enter an active state to start working. In some embodiments, a function of the second heartbeat management module may be implemented by using a corresponding thread. Then, when receiving the second start indication, the second device may initiate a thread corresponding to the second heartbeat management module to start running.

In an example, the second heartbeat management module may send a heartbeat packet to the second data transmission module. The heartbeat packet may be used to query the current call status from the first device. With reference to the foregoing example, the current call status may include incoming call ringing, in a call, hanging up, and the like.

Therefore, according to the feedback from the first device on the heartbeat packet, the second device may determine a current latest call status, so as to determine whether to continue to provide simultaneous vibration.

For example, the second heartbeat management module may send a first heartbeat packet to the second data transmission module (that is, perform S807). The first heartbeat packet may be used to query the current call status from the first device. Then, the second data transmission module may send the first heartbeat packet, for example, to the first data transmission module of the first device (that is, perform S808). In this way, the current latest call status can be queried.

It should be noted that, for the second device, when it is determined that the first device currently starts incoming call ringing, when the second device has a voice pickup capability, the second device may also be used as a voice input end of the incoming call. For example, after the user answers the incoming call, voice may be input by using the second device. Correspondingly, the second device may send a picked-up voice signal of the user to the first device, and the first device may send the voice signal to the incoming call device to implement a voice call.

In this way, by using the foregoing S801-S808, the second device may start to provide simultaneous vibration with the first device to remind the user of the current incoming call. In addition, the second device may further send a heartbeat packet (such as the first heartbeat packet) to the first device to query an updated current call status.

With reference to the description in FIG. 7, the first heartbeat management module in the first device may manage a heartbeat packet (such as the first heartbeat packet) sent by the second device. For example, referring to FIG. 9, the first data transmission module of the first device may receive the first heartbeat packet from the second device (for example, S901). The first data transmission module may transmit the first heartbeat packet to the first heartbeat management module (for example, S902), so that the first heartbeat management module responds to the first heartbeat packet properly.

For example, the first heartbeat management module may query the current call status from the call management module.

With reference to the example of S701 in FIG. 7, the call management module may register call state callback with the call module, and when the call state changes, determine the current call state according to call information sent by the call module. For example, when receiving the first incoming call information, the call management module may determine, according to a first identifier carried in the first call information from the call module, that the current call status is incoming call ringing.

Figure 9:
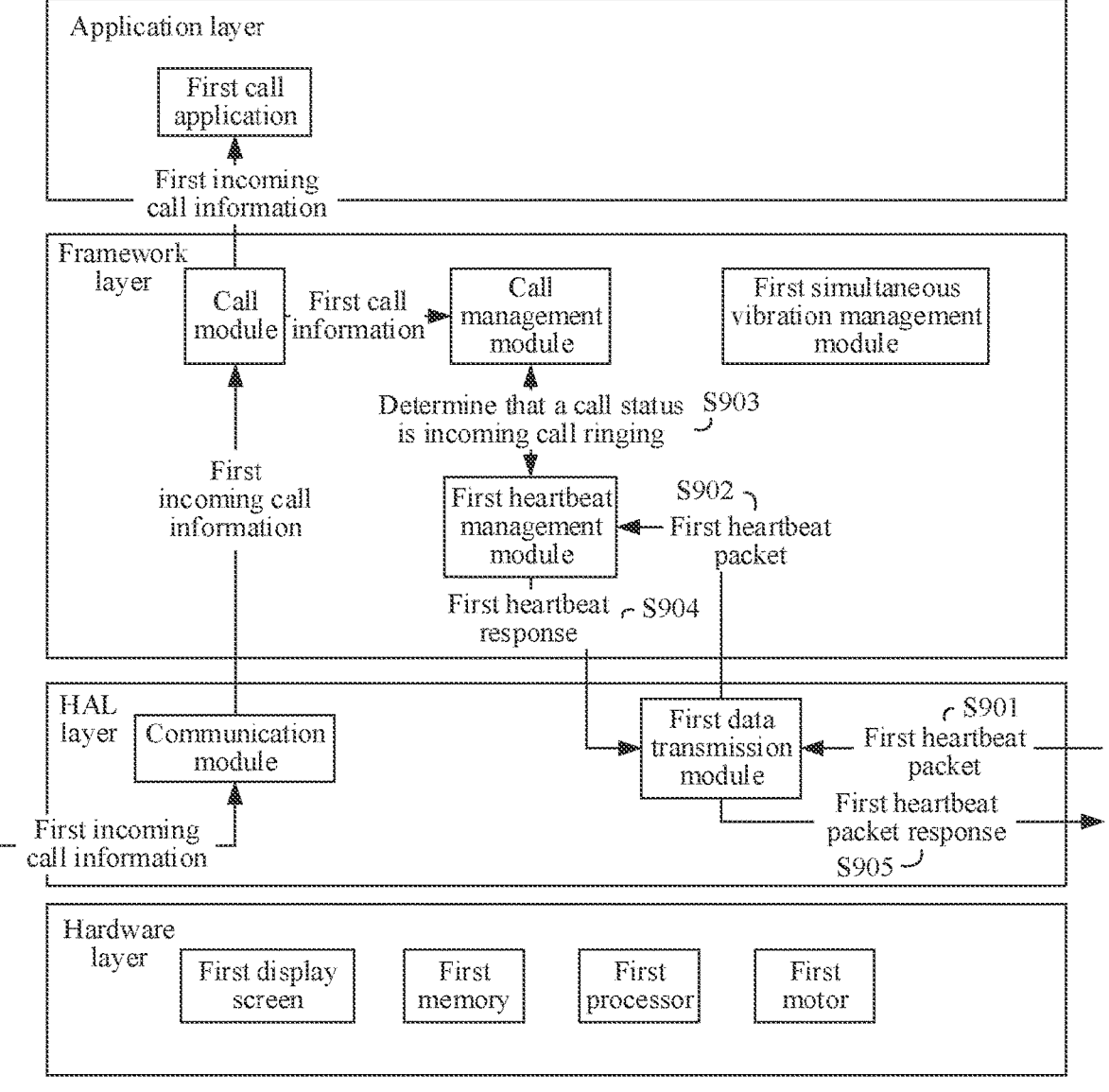
FIG. 9 is a schematic diagram of module interaction of still another incoming call reminder method according to an embodiment of this application.

With reference to FIG. 9, in this example, after receiving the first heartbeat packet, the first heartbeat management module may query the call management module to determine that the call status is incoming call ringing (for example, S903). Then, the first heartbeat management module may respond to the first heartbeat packet, so that the second device can learn that the current incoming call status is still incoming call ringing, and continue to provide simultaneous vibration. It should be noted that, in this example, the first heartbeat management module may directly obtain the current call status from the call management module. In some other embodiments of this application, the first heartbeat management module may further initiate a query to the call management module by using the first simultaneous vibration management module when the current call status needs to be determined by means of query. In this way, the first heartbeat management module may obtain the current call status by using the first simultaneous vibration management module.

For example, as shown in FIG. 9, the first heartbeat management module may send a first heartbeat response to the first data transmission module (for example, S904). The first data transmission module may send the first heartbeat response to the second device (for example, S905), so as to complete a response procedure for the first heartbeat packet.

It should be noted that, in this example, the first heartbeat response may be used as response information of the first heartbeat packet, and is used to indicate that the current call status is not changed (for example, incoming call ringing continues to be kept). The first heartbeat response may be sent immediately after the first device receives the first heartbeat packet. Then, the second device may receive the first heartbeat response in a short time after the first heartbeat packet is sent. In some embodiments, the first heartbeat response may carry a response identifier corresponding to the first heartbeat packet, so that the second device can learn that the first heartbeat response is a response for the first heartbeat packet.

The second device may receive the first heartbeat response, and therefore determines to continue to provide simultaneous vibration.

Figure 10:
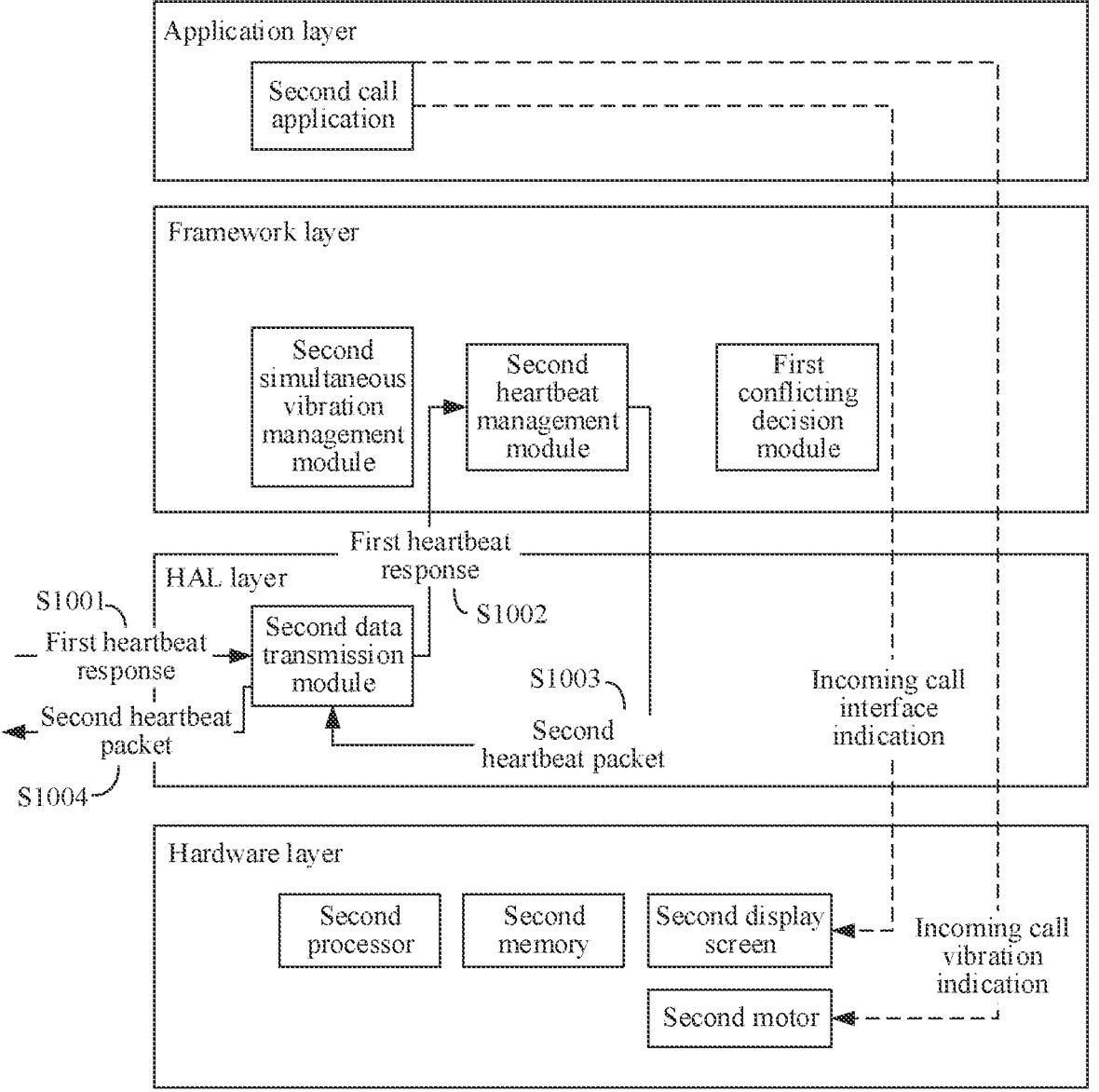
FIG. 10 is a schematic diagram of module interaction of still another incoming call reminder method according to an embodiment of this application.

For example, referring to FIG. 10, the second data transmission module of the second device may receive the first heartbeat response from the first device (for example, S1001). The first heartbeat response may carry the response identifier of the first heartbeat packet, and is used to indicate that the first heartbeat response is a response for the first heartbeat packet. The second data transmission module may transmit the first heartbeat response to the second heartbeat management module of the second device configured to manage the heartbeat mechanism (for example, S1002). After receiving the first heartbeat response, the second heartbeat management module may determine that the current call status is still incoming call ringing. It may be understood that, before the first heartbeat response is received, the second device has started to provide simultaneous vibration. For example, the second call application of the second device may control, by using an incoming call interface instruction, the second display screen to display an incoming call interface. For another example, the second call application of the second device may control, by using an incoming call vibration instruction, the second motor to work, so as to provide vibration, so as to provide the current incoming call of the user. Therefore, when the second heartbeat management module determines that the current call status is incoming call ringing, no change may be made, so that the second device continues to provide simultaneous vibration.

It should be understood that, to update the current latest call status as soon as possible, in some embodiments, the second heartbeat management module may continuously send a heartbeat packet to the first device after starting. Therefore, the second device can continuously determine and update the current call status according to the feedback from the first device. In some other embodiments, the second heartbeat management module may further send a heartbeat packet according to a preset period, so as to reduce, within a reasonable range, overheads introduced by sending continuous heartbeat packets.

For example, in this embodiment of this application, after receiving the first heartbeat response, the second device may continue to send a heartbeat packet to the first device, so as to determine the latest call status. As shown in FIG. 10, the second heartbeat management module may send a second heartbeat packet to the second data transmission module (for example, S1003). Correspondingly, the second data transmission module may send the second heartbeat packet to the first device (for example, S1004).

Figure 11:
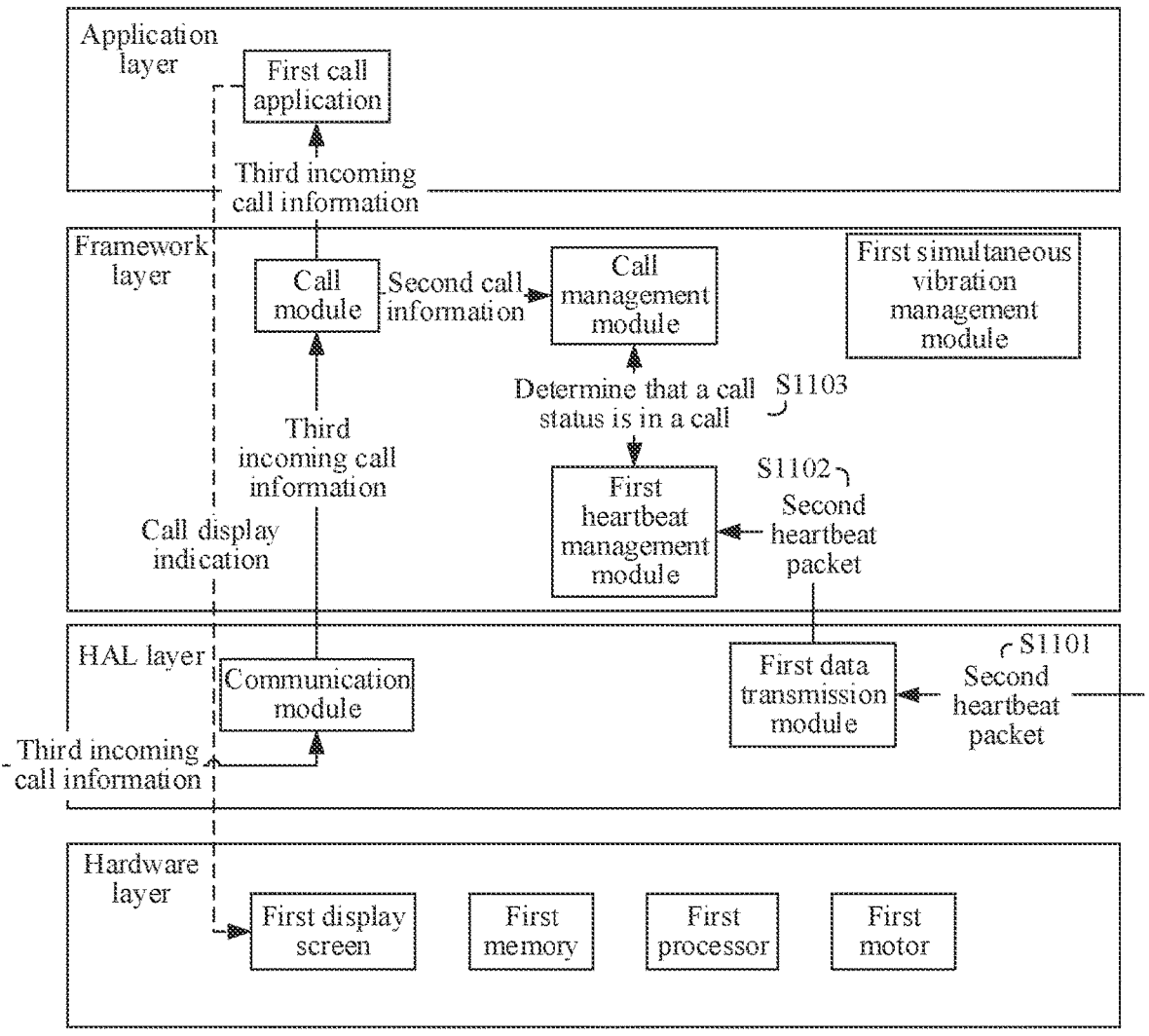
FIG. 11 is a schematic diagram of module interaction of still another incoming call reminder method according to an embodiment of this application.

As shown in FIG. 11, the first data transmission module of the first device may receive the second heartbeat packet from the second device (for example, S1101). The first data transmission module may transmit the second heartbeat packet to the first heartbeat management module (for example, S1102). Similar to the example shown in FIG. 9, the first heartbeat management module may determine the current call status after receiving the second heartbeat packet.

As in the foregoing example, the call status of the first device may include a state such as incoming call ringing, in a call, and hanging up. In a call and hanging up states can also be referred to as non-incoming call ringing states. It may be understood that in the non-incoming call ringing state, the first device and the second device do not need to remind the user of the current incoming call. That is, in the non-incoming call ringing state, the second device does not need to continue to provide simultaneous vibration.

As shown in FIG. 11, an example in which the user answers the current incoming call by using the first device (for example, the user may answer the call by using the example shown in FIG. 2) is used. The communication module of the first device may receive third incoming call information from an incoming call device, where the third incoming call information may include voice information from the incoming call device and the like in the current call. The communication module may transmit the third incoming call information to the call module, and the call module may transmit the third incoming call information to the first call application. Therefore, the first call application may control, according to the third incoming call information, the first device to play voice of the incoming call device to the user, so as to implement a voice call.

In the call process, the first call application may further control, by using the call display instruction, the first display screen to display the call interface. For example, the call interface may be corresponding to the interface of the mobile phone 110 shown in FIG. 3.

The call module can call back the current call status to the call management module when the call status changes. For example, as shown in FIG. 11, the call module may send second call information to the call management module, where the second call information may carry a second identifier, and the second identifier may be used to indicate that a current call status is in a call.

After receiving the second heartbeat packet, the first heartbeat management module queries the current call status from the call management module. In this case, for example, in S1103, the queried call status may be in a call. In this way, the first heartbeat management module may determine that the second device does not need to continue to perform simultaneous vibration.

In some embodiments, the first heartbeat management module may send a stop simultaneous vibration indication to the second device by using the first data module, so as to indicate that the second device does not need to perform simultaneous vibration.

In some other embodiments, the first heartbeat management module may not respond to the second heartbeat packet. For example, after performing S1103, the first heartbeat management module may discard the second heartbeat packet obtained from S1102. In this case, the second device does not receive the response from the first device for the second heartbeat packet, so that it is learned that simultaneous vibration does not need to be further provided.

Figure 12:
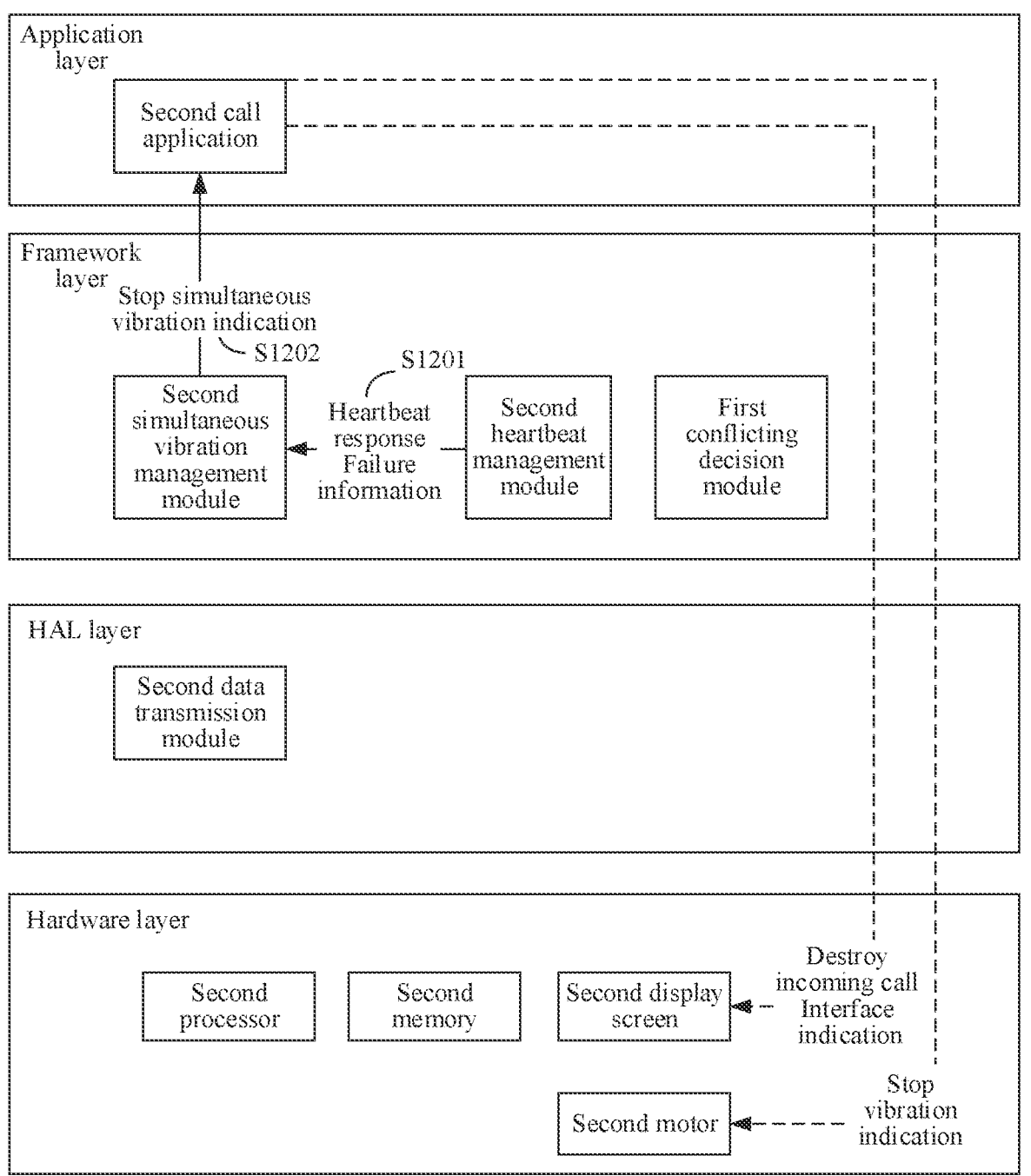
FIG. 12 is a schematic diagram of module interaction of still another incoming call reminder method according to an embodiment of this application.

For example, as shown in FIG. 12, the second heartbeat management module of the second device may monitor that no second heartbeat response is received within preset duration after the second heartbeat packet is sent. Therefore, the second heartbeat management module may determine that the current call status has changed, for example, is in the non-incoming call ringing state. For example, a timer of preset duration may be disposed in the second heartbeat management module. Each time one heartbeat packet is sent, the second heartbeat management module may control the timer to start timing. When the timer stops counting, that is, after the preset duration since the heartbeat packet is sent, if a corresponding heartbeat packet response is received, the heartbeat packet response is a valid response, and the second device may determine to continue simultaneous vibration. Correspondingly, when the timer stops counting, that is, after the preset duration since the heartbeat packet is sent, if no corresponding heartbeat packet response is received, the second device may determine to stop simultaneous vibration.

Then, the second heartbeat management module may send heartbeat response failure information to the second simultaneous vibration management module (for example, S1201). The heartbeat response failure information may be used to indicate that the heartbeat packet does not receive a response. Correspondingly, after receiving the heartbeat response failure information, the second simultaneous vibration management module may determine that no simultaneous vibration needs to be continued to be provided.

In an example, the second simultaneous vibration management module may send a stop simultaneous vibration indication to the second call application (for example, S1202). Correspondingly, the second call application may send an incoming call interface destruction indication to the second display screen. Therefore, the second display screen is indicated to destroy the incoming call interface. In addition, the second call application may further send a stop vibration indication to the second motor. Therefore, the second motor is indicated to stop vibration. In this way, when the call status on the first device is no longer in incoming call ringing, the second device may stop simultaneous vibration in a timely manner.

It should be noted that, in some other embodiments of this application, the second device may send the heartbeat packet to the first device again when no heartbeat response is received within the preset duration. For example, no heartbeat response is received within the preset duration after the second heartbeat packet is sent, and the second heartbeat management module may send a third heartbeat packet to the first device by using the second data transmission module. If no response is received within the preset duration after the third heartbeat packet is sent, the second device may determine that the current call status has changed to non-incoming call ringing, and then perform S1201 to stop simultaneous vibration. Therefore, by sending a plurality of heartbeat packets, it is determined that simultaneous vibration is stopped in a case in which the plurality of consecutive heartbeat packets have no corresponding response, thereby improving decision accuracy of determining, by the second device, whether to stop simultaneous vibration.

In the foregoing example, the simultaneous vibration solution provided in this embodiment of this application is described from a perspective of module interaction between the first device and the second device. The following describes, with reference to module interaction between the first device and the second device, the solutions provided in this embodiment of the first device by using an example.

For example, the server end device is used as the first device, and the client end devices include the second device. When the client end devices include more second devices, implementations of the response process may refer to each other.

FIG. 13A, FIG. 13B, FIG. 13C, and FIG. 13D are schematic diagrams of interaction of an incoming call reminder method according to an embodiment of this application.

Figure 13A:
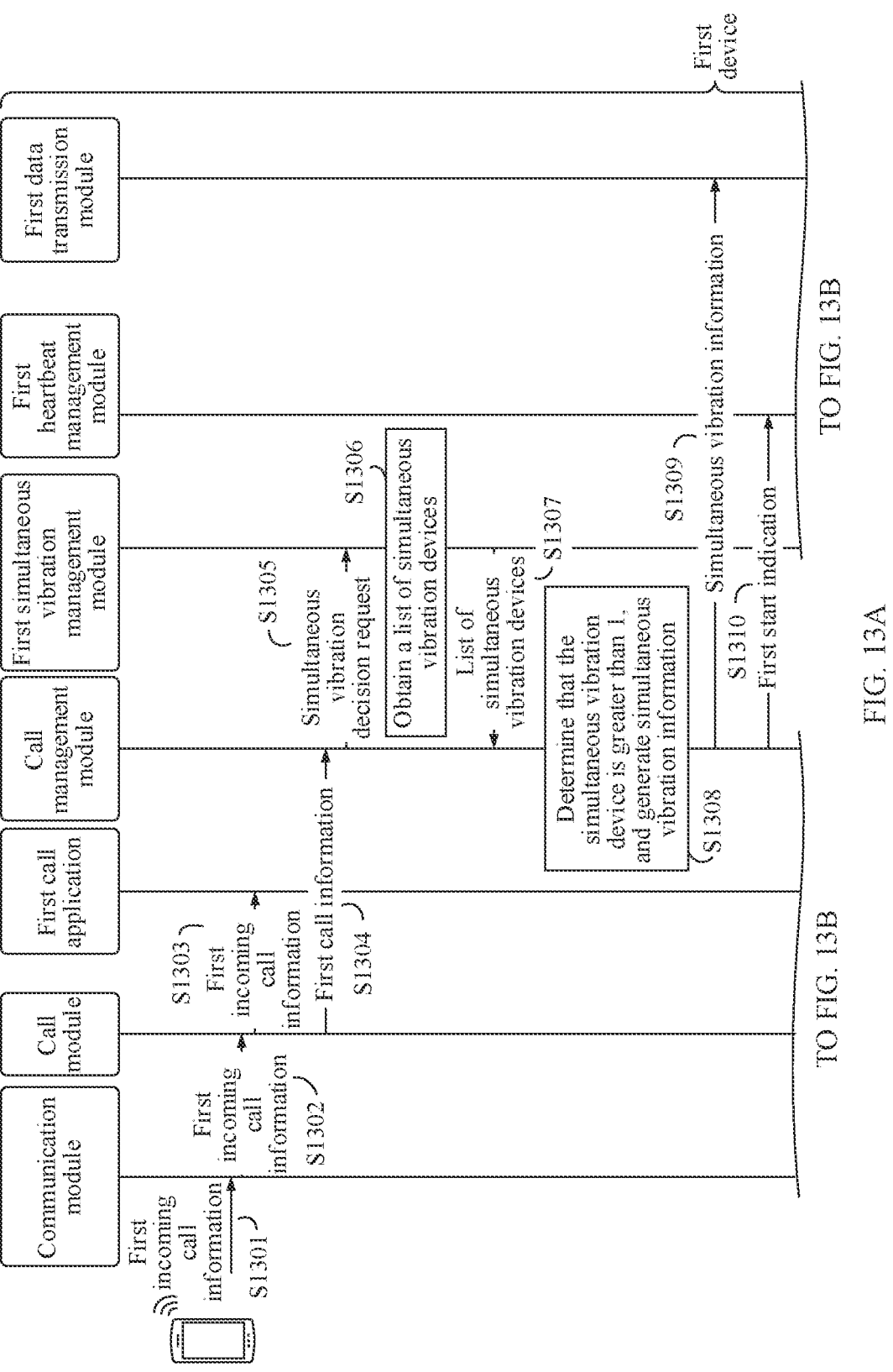
FIG. 13A, FIG. 13B, FIG. 13C, and FIG. 13D are schematic flowcharts of inter-module interaction of an incoming call reminder method according to an embodiment of this application.
Figure 13B:
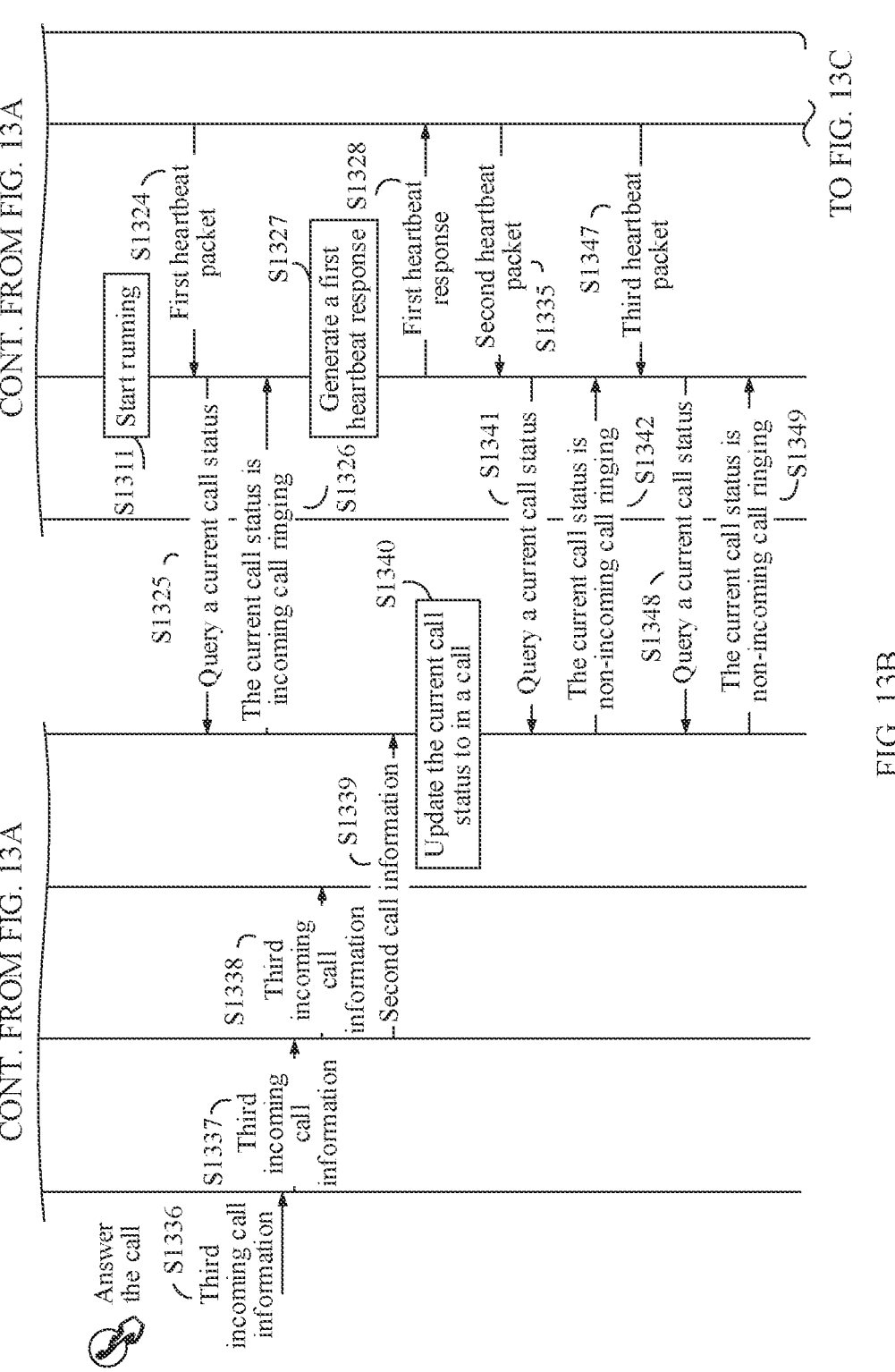
Figure 13C:
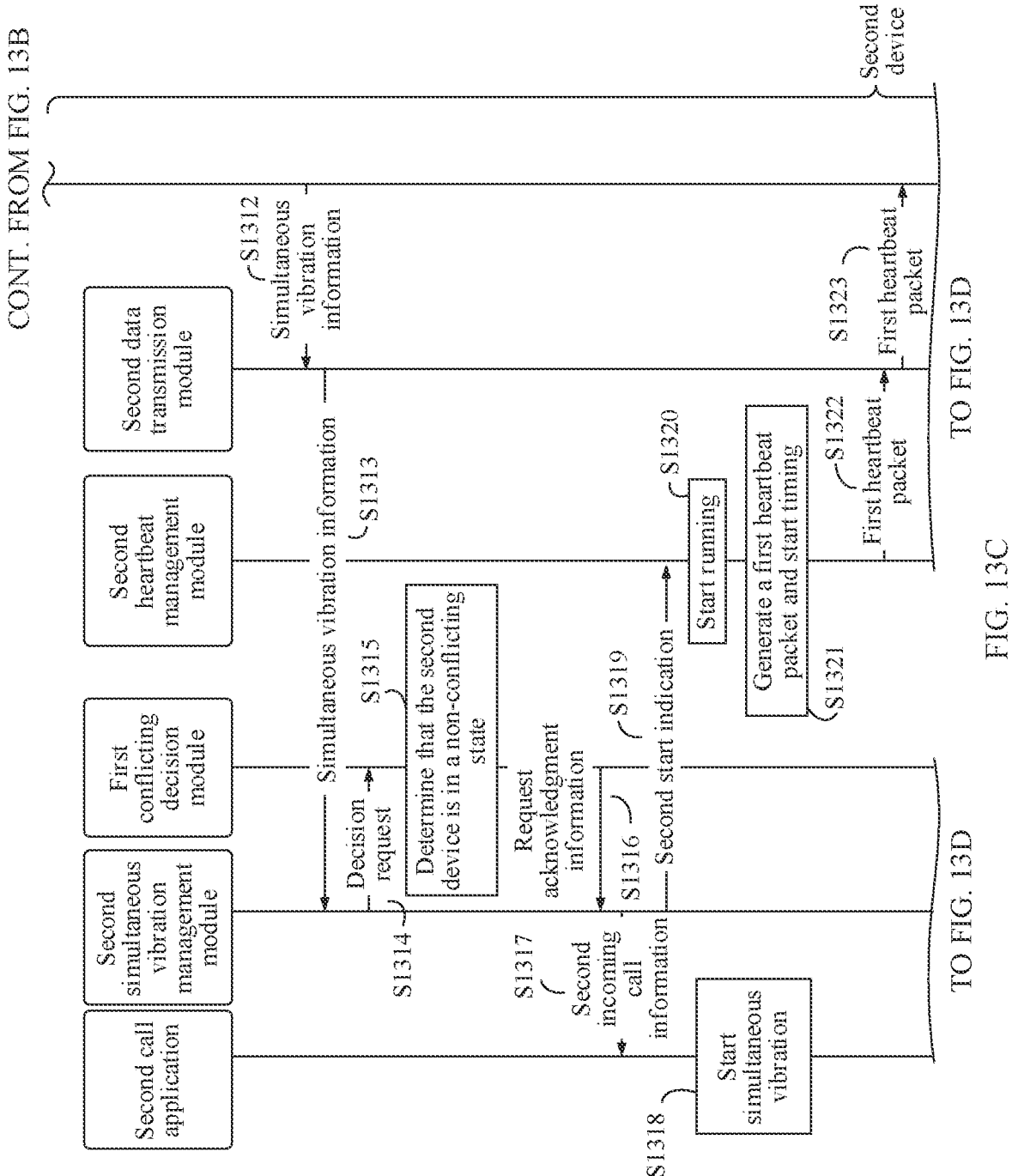

As shown in FIG. 13A, the solution may include the following steps.

S1301. A communication module of a first device receives first incoming call information.

For example, the communication module of the first device may include components such as a modem of the first device. The first incoming call information may be incoming call information sent by an operator base station accessed by the first device. In some embodiments, the first incoming call information may include a number (i.e., an incoming call number) of an incoming call device, and the like.

S1302. The communication module of the first device transmits the first incoming call information to a call module of the first device.

For example, the call module may include TeleService and TeleComm that are running in the first device.

S1303. The call module of the first device transmits the first incoming call information to a first call application.

Therefore, the first call application (for example, a call application set in a system of the first device) may learn of a current incoming call. In some embodiments, the first call application may control the first device to ring, vibrate, and/or display an incoming call interface, to remind a user of the current incoming call.

S1304. The call module transmits the first call information to a call management module.

The first call information may be used to indicate related information of the current incoming call. For example, the first call information may include information such as a current incoming call number and an incoming call contact.

The first call information may further include a current call status, such as incoming call ringing, in a call, and hanging up.

In some embodiments, the call management module may include InCallSevice running in a super call module. Then. TeleComm corresponding to the call module may send the first call information to InCallSevice when receiving the incoming call information (such as the first incoming call information).

S1305. The call management module of the first device initiates a simultaneous vibration decision request to a first simultaneous vibration management module.

The simultaneous vibration decision request may be used to obtain a list of simultaneous vibration devices.

S1306. The first simultaneous vibration management module obtains a list of simultaneous vibration devices.

For example, in some embodiments, the first device may store a trust list of second devices that are in a coordinated relationship with the first device. Then, the first simultaneous vibration management module may obtain the trust list from a first memory of the first device as the list of simultaneous vibration devices.

In some other embodiments, after obtaining the trust list from the first memory of the first device, the first simultaneous vibration management module may perform a coordinated communication test with each second device in the trust list, and put a second device (that is, an online second device) for which the test succeeds into the list of simultaneous vibration devices.

S1307. The first simultaneous vibration management module sends the list of simultaneous vibration devices to the call management module.

For example, the list of simultaneous vibration devices may include information about at least one second device that can perform simultaneous vibration. The information about the second device may include a device ID, a communication address, and/or the like of the second device.

S1308. The call management module determines that the simultaneous vibration device is greater than 1, and generates simultaneous vibration information.

The simultaneous vibration device may be a general name of all coordinated devices including the first device. Then, the call management module may determine, according to the list of simultaneous vibration devices, that at least one second device included therein different from the first device may perform simultaneous vibration. Therefore, it is determined that the simultaneous vibration device is greater than 1. Correspondingly, the call management module may generate simultaneous vibration information, which is used to indicate the second device to perform simultaneous vibration.

S1309. The call management module sends the simultaneous vibration information to the second device by using the first data transmission module.

In this example, in addition to sending the simultaneous vibration information to the second device to indicate the second device to perform simultaneous vibration, the first device may further perform another operation, so as to prepare for a subsequent situation such as a simultaneous vibration status update, a possible call, and the like.

S1310. The call management module sends a first start indication to a first heartbeat management module.

For example, the call management module may start the first heartbeat management module, so that the first heartbeat management module enters an active state to manage and control a subsequent heartbeat mechanism.

S1311. In response to the first start indication, the first heartbeat management module starts to operate.

By using the foregoing S1301-S1311, the first device may indicate the second device to perform simultaneous vibration while entering the incoming call ringing state.

S1312. A second data transmission module receives the simultaneous vibration information from the first device.

S1313. The second data transmission module transmits the simultaneous vibration information to a second simultaneous vibration management module.

S1314. The second simultaneous vibration management module initiates a decision request to a first conflicting decision module. The decision request is used to determine whether to perform simultaneous vibration.

S1315. The first conflicting decision module determines that the second device is in a non-conflicting state. The conflicting state may include a state in which the second device is in a conference, is in multi-screen collaboration, is in a video call, is in a do not disturb state, and the like. Correspondingly, the non-conflicting state indicates that the second device is not in the foregoing conflicting states.

S1316. The first conflicting decision module sends request acknowledgement information to the second simultaneous vibration management module. The request acknowledgement information may be used to indicate the second simultaneous vibration management module that the second device can currently provide simultaneous vibration.

S1317. The second simultaneous vibration management module sends second incoming call information to a second call application. The second incoming call information may be obtained according to the simultaneous vibration information. The second incoming call information may include information such as a current incoming call number and an incoming call contact.

S1318. The second call application starts to perform simultaneous vibration. For example, the second call application may control the second device to display an incoming call interface, a vibration prompt, and/or a ringing prompt.

In this way, based on the simultaneous vibration information, the second device can provide a coordinated voice call function, for example, perform simultaneous vibration with the first device to remind the user of the current incoming call.

In this embodiment of this application, a heartbeat mechanism may further be disposed in the second device, so as to determine, by means of heartbeat communication, a subsequent opportunity of stopping simultaneous vibration.

S1319. The second simultaneous vibration management module sends a second start indication to a second heartbeat management module. The second start indication may be used to run the second heartbeat management module. In response to the second start indication, the second heartbeat management module may enter an active state to execute the corresponding heartbeat mechanism in the second device.

S1320. The second heartbeat management module starts to operate.

After the second heartbeat control module runs, the heartbeat mechanism in the second device may be provided. For example, the second heartbeat control module may perform the following S1321.

S1321. The second heartbeat management module generates a first heartbeat packet and starts timing. The first heartbeat packet may be used to be sent to the first device, and therefore, it is determined, according to a response for the first heartbeat packet, whether to continue to perform simultaneous vibration. In this example, a timer may further be disposed in the second heartbeat management module. Before the timer stops timing (that is, within the preset duration), if a corresponding response is received, it is considered that the timer is valid. Correspondingly, before the timer stops timing, if no response is received, it is considered that the first device does not respond to the heartbeat packet.

S1322. The second heartbeat management module sends the first heartbeat packet to the second data transmission module.

S1323. The second data transmission module sends the first heartbeat packet to the first device.

S1324. The first data transmission module receives the first heartbeat packet, and sends the first heartbeat packet to the first heartbeat management module.

In this example, the first heartbeat management module may determine a corresponding heartbeat response mechanism according to the current call status. For example, if the current call status is still incoming call ringing, it indicates that the second device may continue simultaneous vibration, and the second device responds to the heartbeat packet. On the contrary, if the current call status is non-incoming call ringing, it indicates that the second device does not need to continue simultaneous vibration, and may not respond to the heartbeat packet.

S1325. The first heartbeat management module queries the current call status from the call management module.

S1326. The call management module feeds back, to the first heartbeat management module, that the current call status is incoming call ringing.

In this case, the second device may continue simultaneous vibration. Correspondingly, the first heartbeat management module may respond to the first heartbeat packet.

S1327. The first heartbeat management module generates a first heartbeat response.

S1328. The first heartbeat management module sends the first heartbeat response to the second device by using the first data transmission module.

In this way, the first device may send the first heartbeat response by responding to the first heartbeat packet, so as to indicate the second device to continue to perform simultaneous vibration.

S1329. The second data transmission module receives the first heartbeat response.

S1330. The second data transmission module transmits the first heartbeat response to the second heartbeat management module.

S1331. The second heartbeat management module determines that the first heartbeat response is received within the preset duration, and resets the timer.

For example, the second heartbeat management module may receive the first heartbeat response, and determine that the first heartbeat response falls within the preset duration. Then, the second management module may determine, according to the first heartbeat response, that the second device can continue to perform simultaneous vibration.

It may be understood that, based on execution of S1318, when receiving the first heartbeat response, the second device is providing simultaneous vibration. In this example, after receiving the first heartbeat response, the second heartbeat management module may not interfere with current simultaneous vibration of the second device, so that the second device continues to provide simultaneous vibration.

S1332. The second heartbeat management module generates a second heartbeat packet and starts timing.

The second device may further update the call status by using another heartbeat packet, to determine whether to continue to provide simultaneous vibration. For example, in some embodiments, generation and sending of the first heartbeat packet and the second heartbeat packet may be consecutive, thereby implementing a real-time update effect. In some other embodiments, generation and sending of the first heartbeat packet and the second heartbeat packet may be performed at intervals of a preset period. That is, in each period, the second device may send a heartbeat packet to the first device to determine whether simultaneous vibration needs to be further provided. For example, sending of the second heartbeat packet may be within a preset interval after sending of the first heartbeat packet. In some implementations, the preset interval may be less than 500 ms.

S1333. The second heartbeat management module sends the second heartbeat packet to the second data transmission module.

S1334. The second data transmission module sends the second heartbeat packet to the first device.

S1335. The first data transmission module receives the second heartbeat packet, and sends the second heartbeat packet to the first heartbeat management module.

Similar to the response mechanism for the first heartbeat packet, the first device may determine, after receiving the second heartbeat packet, whether to respond to the second heartbeat packet according to the current call status.

In this example, the first device may receive, before receiving the second heartbeat packet, an operation of answering a call entered by the user. Correspondingly, the first device may enter an in a call state. For example.

S1336. The communication module receives third incoming call information. The third incoming call information may be information in a call. In some implementations, the third incoming call information may include voice information in a call process, and the like.

S1337. The communication module sends the third incoming call information to the call module.

S1338. The call module sends the third incoming call information to the first call application.

In this way, the first call application may play voice of the incoming call device to the user according to the third incoming call information, to implement a call.

Correspondingly, when the call status changes, as shown in S1339, the call module may send second call information to the call management module. The second call information may be used to indicate that the current call status changes to in a call. Alternatively, the second call information may indicate the user that the current call status changes to non-incoming call ringing. Correspondingly, the call management module may perform S1340 and update the current call status to in a call.

It may be understood that with reference to S1335, the first heartbeat management module may determine a corresponding response mechanism according to the current call status after receiving the second heartbeat packet.

S1341. The first heartbeat management module queries the current call status from the call management module.

S1342. The call management module feeds back, to the first heartbeat management module, that the current call status is non-incoming call ringing.

That is, the second device may no longer remind the user of the current incoming call by performing simultaneous vibration.

Correspondingly, the first heartbeat management module may not respond to the second heartbeat packet. Therefore, the second device may not receive a response for the second heartbeat packet within the preset duration, and therefore it is determined that no simultaneous vibration needs to be performed.

For the second device, as shown in S1332, after the second heartbeat packet is sent, the second device may start timing. Because the first device determines not to respond to the second heartbeat packet, the second device may perform the following S1343.

S1343. The second heartbeat management module does not receive a second heartbeat response within the preset duration.

S1344. The second heartbeat management module generates a third heartbeat packet and starts timing again.

In this example, in a case in which the second heartbeat packet has no response, the second device may send a third heartbeat packet to the first device again, so as to re-determine whether the current status continues to provide simultaneous vibration.

S1345. The second heartbeat management module sends the third heartbeat packet to the second data transmission module.

S1346. The second data transmission module sends the third heartbeat packet to the first device.

It may be understood that, similar to the case of the second heartbeat packet, the first device may continue not to respond to the third heartbeat packet. For example, as shown in S1347.

S1347. The first data transmission module receives the third heartbeat packet, and sends the third heartbeat packet to the first simultaneous vibration management module.

S1348. The first simultaneous vibration management module queries the current call status.

S1349. The first simultaneous vibration management module feeds back that the current call status is non-incoming call ringing.

Therefore, for the second device, within the preset duration, a response to the third heartbeat packet is not received.

S1350. The second heartbeat management module does not receive a third heartbeat response within the preset duration.

In this way, the second device may determine that no simultaneous vibration is required. For example, S1351 is performed.

S1351. The second heartbeat management module sends heartbeat response failure information to the second simultaneous vibration management module.

S1352. The second simultaneous vibration management module sends a stop simultaneous vibration indication to the second call application.

S1353. The second call application stops simultaneous vibration.

For example, the second call application may indicate the second display screen to no longer display the incoming call interface, and the second call application may further indicate the second motor to stop a vibration reminder.

Figure 13D:
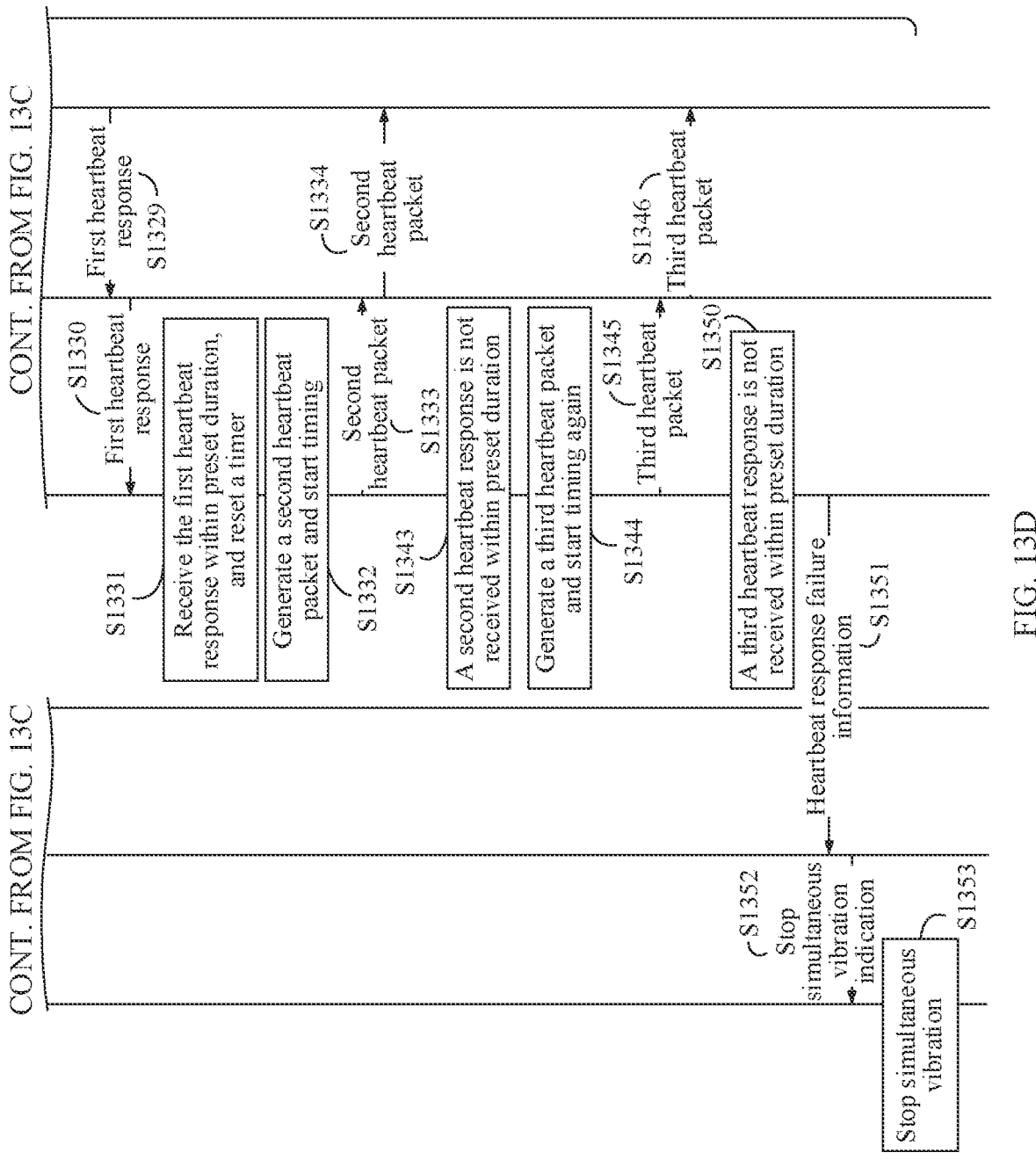

It should be noted that, in the foregoing example of FIG. 13D, an example in which the first device has entered the non-incoming call ringing state when receiving the second heartbeat packet is used. In some other embodiments of this application, before the first device enters the non-incoming call ringing state, a plurality of heartbeat packets sent by the second device may be received. Therefore, because the first device is still in the incoming call ringing state, the first device may respond to the another heartbeat packet by referring to the response mechanism for the first heartbeat packet, so that the second device may continue simultaneous vibration according to the heartbeat response. In addition, in some other embodiments of this application, the second device may also determine, after a plurality of consecutive heartbeat packets do not receive a heartbeat response, that the first device has entered the non-incoming call response state, and the corresponding second device may also stop simultaneous vibration.

In this way, by using the heartbeat mechanism, the second device can quickly and accurately determine whether to continue to provide simultaneous vibration, thereby improving working rationality of each device in a multi-device coordinated working process and improving user experience.

In the foregoing example, the incoming call reminder method provided in this embodiment of this application is described from a perspective of interaction between the first device and the second device. The following describes the solutions provided in the embodiments of this application from a perspective of electronic device interaction with reference to the accompanying drawings.

Figure 14:
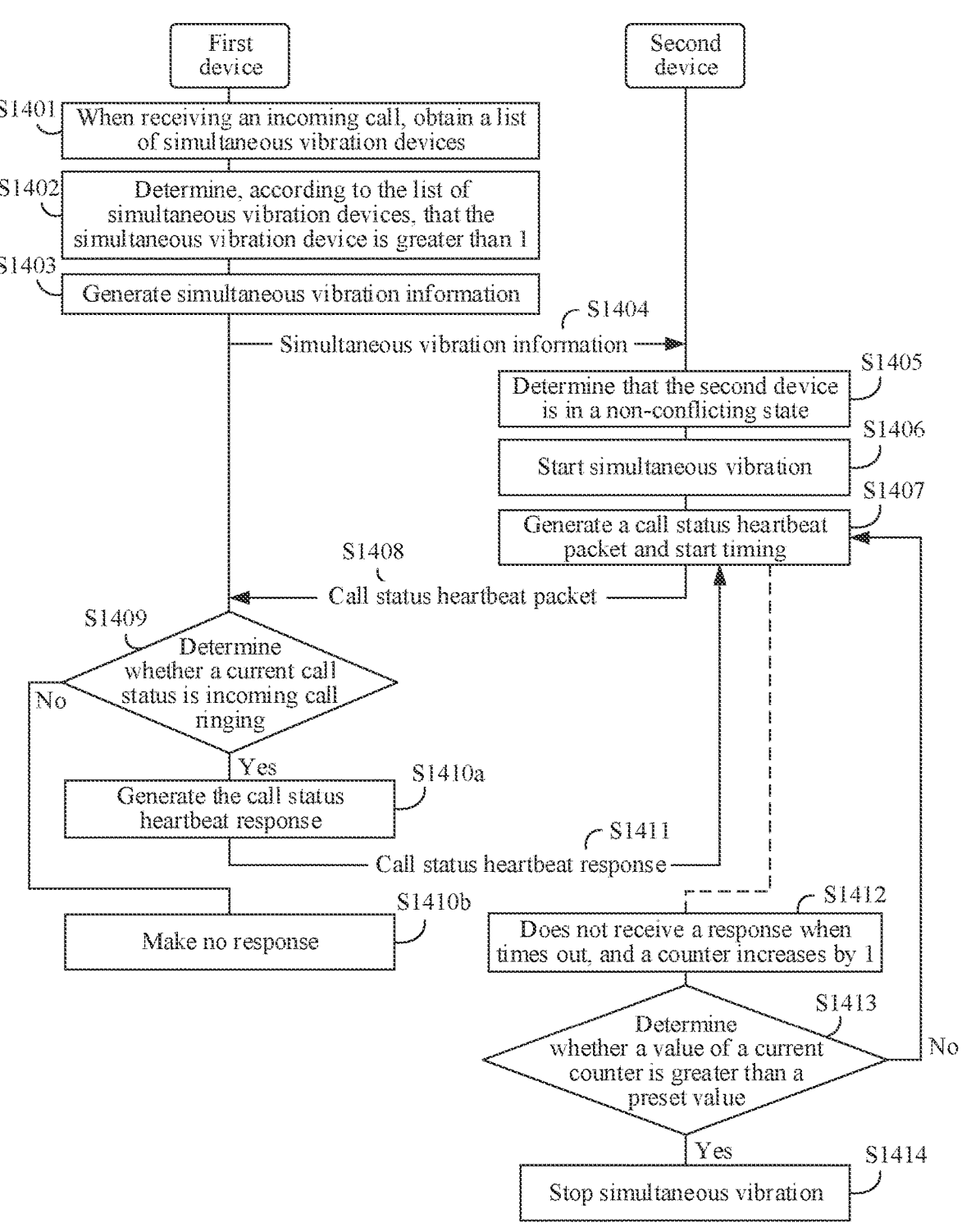
FIG. 14 is a schematic flowchart of inter-device interaction of an incoming call reminder method according to an embodiment of this application.

For example, FIG. 14 is a schematic flowchart of still another incoming call reminder method according to an embodiment of this application. A first device may be a server end device, and a second device may be a client end device. As shown in FIG. 14, the solution may include the following steps.

S1401. When receiving an incoming call, the first device obtains a list of simultaneous vibration devices.

S1402. The first device determines, according to the list of simultaneous vibration devices, that the simultaneous vibration device is greater than 1.

S1403. The first device generates simultaneous vibration information.

S1404. The first device sends the simultaneous vibration information to the second device.

S1405. The second device determines that the second device is in a non-conflicting state.

S1406. The second device starts to perform simultaneous vibration.

S1407. The second device generates a call status heartbeat packet and starts timing. In this example, the call status heartbeat packet may be corresponding to the first heartbeat packet, the second heartbeat packet, and the third heartbeat packet in the foregoing example.

S1408. The second device sends the call status heartbeat packet to the first device.

S1409. The first device determines whether a current call status is incoming call ringing.

When determining that the current call status is incoming call ringing, perform S1410a. Otherwise, when it is determined that the current call status is non-incoming call ringing, perform S1410b.

S1410a. The first device generates a call status heartbeat response. In this example, the call status heartbeat response may be corresponding to the first heartbeat response, the second heartbeat response, and the third heartbeat response in the foregoing example. Then, S1411 may be performed.

S1411. The first device sends the call status heartbeat response to the second device.

When receiving the call status heartbeat response, the second device returns to perform S1407.

In this way, after receiving the call status heartbeat response, the second device may continue to provide simultaneous vibration, and continue to communicate with the first device by using the heartbeat packet, to determine whether to continue to provide simultaneous vibration subsequently.

S1410b. The first device does not respond. That is, when the first device is not in the incoming call ringing state, the first device does not respond to the call status heartbeat packet from the second device.

In this case, the second device may continue to perform S1412.

S1412. The second device does not receive a response when times out, and a counter increases by 1.

In this example, a counter may be disposed in the second device, and the counter may be set to zero when the first call status heartbeat packet is sent. If no response is received every time a timeout occurs, the counter increases by 1.

S1413. The second device determines whether a value of the current counter is greater than a preset value. If yes, S1414 is performed. If no, S1407 is performed. In some embodiments, the preset value may be set to 2.

S1414. The second device stops simultaneous vibration. It may be understood that in this example, if the counter reaches the preset value, it indicates that the second device has a plurality of consecutive heartbeat packets that are not responded when times out. In this case, the second device may stop simultaneous vibration, so as to avoid an error reminder to the user.

Therefore, based on the inter-device interaction shown in FIG. 14, simultaneous vibration policy control implemented by the second device according to the heartbeat packet can be implemented. For example, when the first device is in incoming call ringing, simultaneous vibration is provided. For another example, when the first device is in non-incoming call ringing, simultaneous vibration is stopped.

In the foregoing example, simultaneous vibration control is performed on a plurality of devices in a scenario of an operator-based voice call. It may be understood that in another scenario related to simultaneous vibration, such as a voice chat or a video chat, the simultaneous vibration solution provided in this embodiment of this application may be used, so that multi-device simultaneous vibration control can be more quick and accurate and user experience can be improved.

Figure 15:
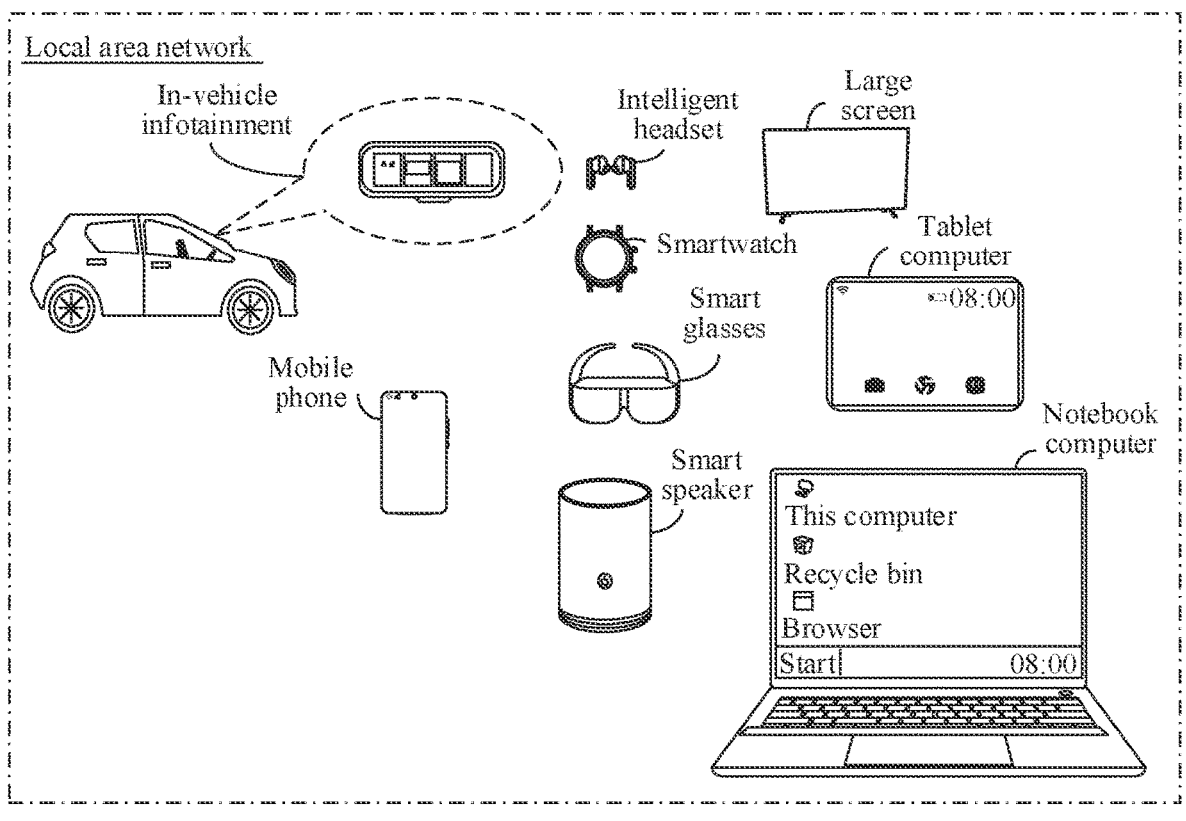
FIG. 15 is a schematic diagram of a multi-device scenario according to an embodiment of this application.

By using the foregoing description, a person skilled in the art should be able to clearly understand the incoming call reminder solution provided in the embodiments of this application. In a specific implementation process, the solution may be applied to the foregoing system including the client end device and the server end device. Similar to the foregoing description, the server end device may be a mobile phone. Correspondingly, in different scenarios, the client may include at least one of the notebook computer, the smart watch, or the tablet computer in the foregoing description. In another scenario, the client end device may further include another device. For example, referring to FIG. 15, the client end device may further include any one or more of the following: a smart headset, smart glasses, a smart sound box, a large screen (or a smart screen), an in-vehicle infotainment (that is, an in-vehicle terminal), and the like. In specific implementation, the client end device and the server end device may be in a same local area network. In addition, the client end device and the server end device may also log in to a same account, such as an honor account. In this way, based on the incoming call reminder solution provided in this embodiment of this application, after receiving an incoming call, the server end device may control, by using the solution in the foregoing example, another client end device to perform simultaneous vibration, so as to control the client end device to remind the user of the current incoming call. However, after the incoming call of the server end device is answered or bung up, the client end device may not respond to a heartbeat packet sent by the client end device, so that the client end device can stop simultaneous vibration.

Figure 16:
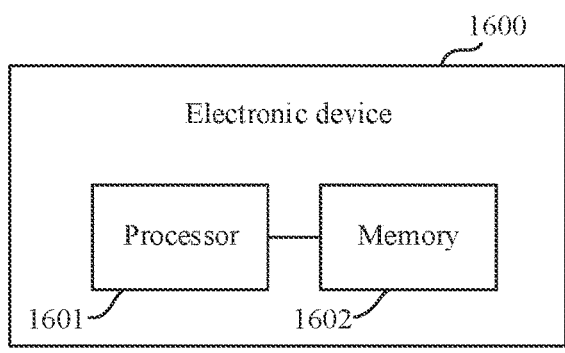
FIG. 16 is a schematic diagram of composition of another electronic device according to an embodiment of this application.

FIG. 16 is a schematic diagram of composition of another electronic device according to an embodiment of this application. The electronic device may be the first device involved in the foregoing embodiment, that is, the server end device. As shown in FIG. 16, the electronic device 1600 may include: a processor 1601 and a memory 1602. The memory 1602 is configured to store computer executable instructions. For example, in some embodiments, when the processor 1601 executes the instructions stored in the memory 1602, the electronic device 1600 is enabled to perform any technical solution of the first device in the foregoing embodiments.

It should be noted that, all related content of each step involved in the foregoing method embodiment may be referenced to a function description of a corresponding functional module, and details are not described herein again.

Figure 17:
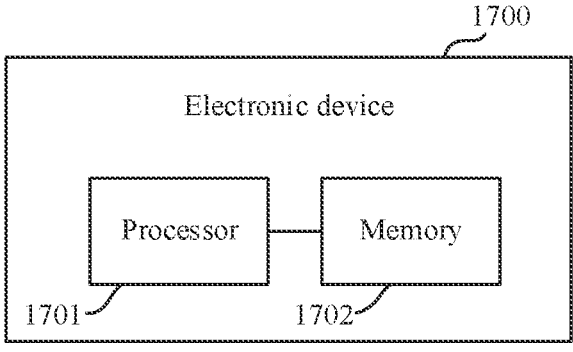
FIG. 17 is a schematic diagram of composition of another electronic device according to an embodiment of this application.

FIG. 17 is a schematic diagram of composition of another electronic device according to an embodiment of this application. The electronic device may be the second device involved in the foregoing embodiment, that is, the client end device. As shown in FIG. 17, the electronic device 1700 may include: a processor 1701 and a memory 1702. The memory 1702 is configured to store computer executable instructions. For example, in some embodiments, when the processor 1701 executes the instructions stored in the memory 1702, the electronic device 1700 is enabled to perform any technical solution of the second device in the foregoing embodiments.

It should be noted that, all related content of each step involved in the foregoing method embodiment may be referenced to a function description of a corresponding functional module, and details are not described herein again.

Figure 18:
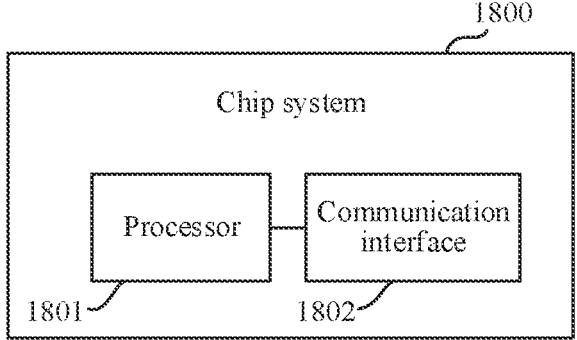
FIG. 18 is a schematic composition diagram of a chip system according to an embodiment of this application.

FIG. 18 is a schematic diagram of composition of a chip system 1800. The chip system 1800 may include: a processor 1801 and a communication interface 1802, configured to support a related device (for example, the first device or the second device) to implement the functions involved in the foregoing embodiments. In a possible example, the chip system further includes a memory for saving necessary program instructions and data of a terminal. The chip system may include a chip, or may include a chip and another discrete device. It should be noted that, in some implementations of this application, the communication interface 1802 may also be referred to as an interface circuit.

It should be noted that, all related content of each step involved in the foregoing method embodiment may be referenced to a function description of a corresponding functional module, and details are not described herein again.

All or some of the functions or motions or operations or steps in the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the processes or functions according to the embodiments of this application are produced. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application is described with reference to specific features and embodiments, it is clear that various modifications and combinations may be made to this application without departing from the spirit and scope of this application. Correspondingly, this specification and the accompanying drawings are merely example description of this application defined by the appended claims, and are considered as any of or all modifications, variations, combinations or equivalents that cover the scope of this application. Obviously, a person skilled in the art can make various modifications and variations to this application without departing from the spirit and scope of this application. In this way, this application is also intended to include these modifications and variations made to this application if they fall within the scope of the claims of this application and equivalent technologies thereof.

What is claimed is:

1. A method, comprising:

entering an incoming call ringing state in response to receiving an incoming call by a first electronic device, wherein the incoming call ringing state is configured to remind a user of the incoming call;

receiving a first heartbeat packet from a second electronic device when the first electronic device is in the incoming call ringing state, wherein the second electronic device is communicatively coupled to the first electronic device; and sending a first heartbeat response to the second electronic device, wherein the first heartbeat response is configured to cause the second electronic device to remain in the incoming call ringing state after the second electronic device receives the first heartbeat response, wherein the second electronic device is in the incoming call ringing state when sending the first heartbeat packet.

2. The method of claim 1, further comprising:

receiving a second heartbeat packet from the second electronic device when the first electronic device is in a non-incoming call ringing state, wherein the second electronic device is in the incoming call ringing state when sending the second heartbeat packet; and skipping sending a second heartbeat response to the second electronic device in response to receiving the second heartbeat packet, such that the second device exits the incoming call ringing state.

3. The method of claim 2, wherein the non-incoming call ringing state comprises any one of the following: answering the incoming call and hanging up.

4. The method of claim 2, further comprising:

generating a simultaneous vibration decision request according to the incoming call, wherein the simultaneous vibration decision request is configured to obtain a list of simultaneous vibration devices, and when the list of simultaneous vibration devices is not empty, the list of simultaneous vibration devices comprises device information of at least one second electronic device, wherein the device information comprises a device identifier (ID) and/or a communication address of the second electronic device;

obtaining the list of simultaneous vibration devices;

generating simultaneous vibration information according to the list of simultaneous vibration devices when the list of simultaneous vibration devices is not empty, wherein the simultaneous vibration information indicates at least one second electronic device in the list of simultaneous vibration devices to perform simultaneous vibration; and sending the simultaneous vibration information to the second electronic device in the list of simultaneous vibration devices.

5. The method of claim 4, wherein the list of simultaneous vibration devices is disposed in a memory of the first electronic device, and either a) wherein if the first electronic device logs in to a first account, when the first electronic device accesses a local area network, the method further comprises searching for whether a second electronic device that logs in to the first account exists in the local area network, and if the second electronic device exists, storing device information of the second electronic device into the list of simultaneous vibration devices, or b) wherein if the first electronic device has accessed the local area network, when the first electronic device logs in to the first account, the method further comprises searching the local area network for whether a second electronic device that logs in to the first account exists, and if the second electronic device exists, storing device information of the second electronic device into the list of simultaneous vibration devices.

6. The method of claim 4, wherein before generating simultaneous vibration information, the method further comprises:

sending a communication acknowledgement message to at least one second electronic device in the list of simultaneous vibration devices, wherein the communication acknowledgement message is configured to determine whether the second electronic device is online; and generating the simultaneous vibration information when a communication response message of the second electronic device for the communication acknowledgement message is received.

7. The method of claim 1, wherein entering the incoming call ringing state comprises reminding the user of the incoming call by displaying an incoming call interface corresponding to the incoming call, a ringing prompt, a vibration prompt, or a combination thereof.

8. The method of claim 1, wherein before sending the first heartbeat response to the second electronic device, a current call status is the incoming call ringing state.

9. The method of claim 1, wherein the first heartbeat packet is configured to determine a call status of the incoming call on the first electronic device, and sending the first heartbeat response comprises sending the first heartbeat response within a preset duration after the first heartbeat packet is received.

10. A method, comprising:

entering, by a second electronic device, an incoming call ringing state that corresponds to an incoming call received by a first electronic device, wherein the incoming call ringing state is configured to remind a user of the incoming call;

sending a first heartbeat packet to the first electronic device;

receiving a first heartbeat response from the first electronic device after the first electronic device receives the first heartbeat packet, wherein the first electronic device is in the incoming call ringing state when the first electronic device receives the first heartbeat packet; and maintaining the incoming call ringing state by the second electronic device in response to receiving the first heartbeat response.

11. The method of claim 10, further comprising:

sending a second heartbeat packet to the first electronic device, wherein the second electronic device is in the incoming call ringing state when sending the second heartbeat packet; and stopping the incoming call ringing state in response to not receiving a second heartbeat response within a preset duration, wherein the first electronic device is in a non-incoming call ringing state when the first electronic device receives the second heartbeat packet, and the second heartbeat response corresponds to the second heartbeat packet.

12. The method of claim 11, wherein entering the incoming call ringing state comprises reminding the user of the incoming call by displaying an incoming call interface corresponding to the incoming call, a ringing prompt, a vibration prompt, or a combination thereof.

13. The method of claim 11, wherein the preset duration begins after sending the second heartbeat packet, and wherein not receiving the second heartbeat response within the preset duration comprises not receiving the second heartbeat response corresponding to the second heartbeat packet before the preset duration ends.

14. The method of claim 11, wherein before the second heartbeat response is not received within the preset duration, the method comprises:

sending a third heartbeat packet to the first electronic device, wherein the second electronic device is in the incoming call ringing state when sending the third heartbeat packet; and not receiving a third heartbeat response corresponding to the third heartbeat packet within the preset duration.

15. The method of claim 10, wherein the first electronic device and the second electronic device are located in a same local area network, and the first electronic device and the second electronic device log in to a same account.

16. The method of claim 10, wherein before the second electronic device enters the incoming call ringing state, the method further comprises receiving simultaneous vibration information that indicates to the second electronic device to enter the incoming call ringing state.

17. The method of claim 16, wherein after receiving simultaneous vibration information, the method further comprises:

generating a decision request according to the simultaneous vibration information, wherein the decision request is configured to determine whether the second electronic device is in a non-conflicting state; and starting simultaneous vibration when the second electronic device is in the non-conflicting state.

18. The method of claim 17, wherein the second electronic device is in the non-conflicting state when the second electronic device is not in any one of the following states: in a conference, in multi-screen collaboration, in a video call, and do not disturb.

19. The method of claim 10, wherein the first heartbeat packet is configured to determine a call status of the incoming call on the first electronic device, and wherein the first heartbeat response is received within preset duration after sending the first heartbeat packet.

20. A method, comprising:

entering an incoming call ringing state in response to receiving an incoming call by a first electronic device;

entering, by a second electronic device, an incoming call ringing state corresponding to the incoming call, wherein the incoming call ringing state is configured to remind a user of the incoming call;

sending, by the second electronic device, a first heartbeat packet to the first electronic device;

receiving, by the first electronic device, the first heartbeat packet from the second electronic device when the first electronic device is in the incoming call ringing state;

sending, by the first electronic device, a first heartbeat response to the second electronic device in response to receiving the first heartbeat packet; and maintaining, by the second electronic device, the incoming call ringing state in response to receiving the first heartbeat response.

* * * * *